United States Patent
Griswold et al.

(10) Patent No.: US 7,339,887 B2
(45) Date of Patent: *Mar. 4, 2008

(54) MULTIPOINT PROTECTED SWITCHING RING

(75) Inventors: David Stephen Griswold, Chapel Hill, NC (US); Prayson Will Pate, Durham, NC (US); Robert Leroy Lynch, Raleigh, NC (US); Glenn Russell Swope, Raleigh, NC (US)

(73) Assignee: Overture Networks, Inc., Morrisville, NC (US)

( * ) Notice: Subject to any disclaimer, the term of this patent is extended or adjusted under 35 U.S.C. 154(b) by 351 days.

This patent is subject to a terminal disclaimer.

(21) Appl. No.: 11/180,192

(22) Filed: Jul. 13, 2005

(65) Prior Publication Data

US 2005/0243823 A1    Nov. 3, 2005

Related U.S. Application Data

(63) Continuation-in-part of application No. 11/125,683, filed on May 10, 2005, which is a continuation-in-part of application No. 10/839,864, filed on May 6, 2004, now Pat. No. 6,928,050.

(60) Provisional application No. 60/640,278, filed on Dec. 31, 2004, provisional application No. 60/490,764, filed on Jul. 29, 2003, provisional application No. 60/468,325, filed on May 6, 2003.

(51) Int. Cl.
   *G01R 31/08*   (2006.01)
(52) U.S. Cl. .................... 370/216; 370/403
(58) Field of Classification Search ............ None
   See application file for complete search history.

(56) References Cited

U.S. PATENT DOCUMENTS 4,209,666 A * 6/1980 Lawton .................. 370/222

(Continued)

FOREIGN PATENT DOCUMENTS

EP    0052390 A1    10/1981

(Continued)

OTHER PUBLICATIONS

IEEE Standard 802.1D 1998 Edition, "Information Technology—Telecommunications and Information Exchange Between Systems—Local and metropolitan Area Networks—Common Specifications—Part 3: Media Access Control (MAC) Bridges", ISO/IEC 15802-3; ANSI/IEEE Std 802.1D, Sponsored by the LAN/MAN Standards Committee of the IEEE Computer Society, pp. cover to xix, 50-54, and 78-109.

(Continued)

*Primary Examiner*—Robert W. Wilson
(74) *Attorney, Agent, or Firm*—The Eclipse Group LLP; Kevin E. Flynn

(57) ABSTRACT

Normal 802.3 Ethernet requires a tree topology. If a ring or a loop exists, then packets will be forwarded around the ring indefinitely. If the ring is broken, then there is no possibility of packets being propagated forever. This invention shows how to quickly impose a virtual break in the ring such that all nodes can communicate with each other, and how to remove the virtual break when a real failure occurs. This is accomplished by placing intelligent nodes on the ring that work together to virtually break and restore the ring. An embodiment is disclosed that allows a ring node to bridge user traffic in the case that no switch table entry is present for that traffic. This abstract is provided as an aid to those performing prior art searches and not a limitation on the scope of the claims.

17 Claims, 13 Drawing Sheets

U.S. PATENT DOCUMENTS

| | | | | |
|---|---|---|---|---|
| 4,354,267 A * | 10/1982 | Mori et al. | 714/4 |
| 4,462,099 A * | 7/1984 | Braun | 714/706 |
| 4,527,270 A * | 7/1985 | Sweeton | 714/47 |
| 4,538,264 A * | 8/1985 | Bahr et al. | 714/4 |
| 4,573,044 A * | 2/1986 | McConachie et al. | 370/224 |
| 4,594,709 A | 6/1986 | Yasue | 371/8 |
| 4,633,468 A | 12/1986 | Skatrud et al. | 371/22 |
| 4,654,857 A | 3/1987 | Samson et al. | 371/68 |
| 4,683,563 A | 7/1987 | Rouse et al. | 370/16 |
| 4,709,365 A | 11/1987 | Beale et al. | 371/11 |
| 4,800,559 A | 1/1989 | Florea et al. | 370/94 |
| 5,003,531 A | 3/1991 | Farinholt et al. | 370/16.1 |
| 5,113,398 A | 5/1992 | Howes | 371/11.2 |
| 5,136,589 A | 8/1992 | Konishi | 371/11.2 |
| 5,218,600 A | 6/1993 | Schenkyr et al. | 370/16 |
| 5,317,198 A | 5/1994 | Husbands | 307/116 |
| 5,410,542 A | 4/1995 | Gerbehy et al. | 370/85.1 |
| 5,446,725 A | 8/1995 | Ishiwatari | 370/16.1 |
| 5,469,503 A | 11/1995 | Butensky et al. | 379/265 |
| 5,491,696 A | 2/1996 | Nishimura | 370/16.1 |
| 5,495,472 A | 2/1996 | Ohara | 370/16.1 |
| 5,532,862 A | 7/1996 | Tada et al. | 359/161 |
| 5,651,000 A | 7/1997 | Lee et al. | 370/258 |
| 5,737,370 A | 4/1998 | Hetzel | 375/356 |
| 5,781,530 A * | 7/1998 | Segal | 370/220 |
| 5,796,720 A | 8/1998 | Yoshida et al. | 370/245 |
| 5,944,798 A | 8/1999 | McCarty et al. | 709/251 |
| 5,959,990 A | 9/1999 | Frantz et al. | 370/392 |
| 6,052,210 A | 4/2000 | Nathan | 359/119 |
| 6,111,853 A | 8/2000 | Goodman | 370/224 |
| 6,199,174 B1 | 3/2001 | Norizuki et al. | 714/4 |
| 6,307,652 B1 | 10/2001 | Fassih-Nia et al. | 359/110 |
| 6,430,151 B1 | 8/2002 | Glas et al. | 370/222 |
| 6,581,126 B1 | 6/2003 | Regula | 710/305 |
| 6,678,241 B1 | 1/2004 | Gai et al. | 370/216 |
| 6,717,909 B2 | 4/2004 | Leroux et al. | 370/228 |
| 6,717,922 B2 | 4/2004 | Hsu et al. | 370/258 |
| 6,766,482 B1 | 7/2004 | Yip et al. | 714/717 |
| 6,813,413 B2 | 11/2004 | Bisson et al. | 385/24 |
| 2002/0124107 A1 | 9/2002 | Goodwin | 709/242 |
| 2003/0039243 A1 | 2/2003 | Parker | 370/362 |
| 2003/0059159 A1 | 3/2003 | Bisson et al. | 385/24 |
| 2003/0099191 A1 | 5/2003 | Kim | 370/222 |
| 2003/0223379 A1 | 12/2003 | Yang et al. | 370/256 |
| 2004/0132409 A1 | 7/2004 | Arnold et al. | 455/67.11 |
| 2004/0160904 A1 | 8/2004 | Enomoto et al. | 370/256 |

FOREIGN PATENT DOCUMENTS

| | | |
|---|---|---|
| EP | 0494695 A1 | 7/1992 |
| EP | 0519712 A2 | 12/1992 |
| EP | 0403763 B1 | 9/1994 |
| EP | 0472380 B1 | 6/1999 |
| JP | 07095227 A | 4/1995 |

OTHER PUBLICATIONS

Network Working Group Internet Draft Eric C. Rosen et al., "Multiprotocol Label Switching Architecture: draft-ietf-mpls-arch-05.txt" (Apr. 1999) Title Page, Table of Contents, § 1.1, § 2.23, and § 2.24.

RFC 3034 A. Conta et al., "Use of Label Switching on Frame Relay Networks—Specification" (Jan. 2001), Copyright The Internet Society (2001), Title Page, Introduction § 5.4, § 5.4.1, and § 5.4.2; http://www.apps.ietf.org/rfc/rfc3034.html.

IEEE Standard 802.1w-2001 "IEEE Standard for Local and metropolitan area networks—Common Specifications—Part 3: Media Access Control (MAC) Bridges—Amendment 2: Rapid Reconfiguration", Sponsored by the LAN/MAN Standards Committee of the IEEE Computer Society, date 2001.

Web pages 1-10 printed May 10, 2004 entitled "How Ring Redundancy Works" (2001): http://industrialnetworking.com/support/tutorials/How_Ring_Redundancy_Works.html.

Protected Switching Ring (PSR), Overture Networks, Inc. Feb. 6, 2004 (5 pages); OvertureNetworks.com/products/tech_psr.shtml.

Empower legacy SONET/SDH and TDM networks for metro Ethernet Revenues, Overture Networks, Mar. 14, 2003; http://www.overturenetworks.com.

Overture Expands Access Options for Smaller Firms, Jim Duffy, Network World, Jan. 26, 2004; www.nwfusion.com/News/2004/0126overture.html.

Press Release—"Allied Telesyn Ships First True IP-based Platform for Native POTS, FTTx, and ADSL2+" (Jun. 22, 2004), available over Internet at: http://www.alliedtelesyn.com.hk/press/news_20040622b_us.htm.

Allied Telesyn Technical Brief, "Active vs. PON: FTTx Technology Choices" (Jun. 30, 2004), Rev. A, 10 pages, available at: http://www.alliedtelesyn.com/corporate/media/whitepapers/active_vs_pon_a_wp.pdf.

Allied Telesyn White Paper, "Ethernet Protection Switched Rings: Creating Survivable Ethernet Network", Rev. B (Jul. 9, 2004), 12 pages, available on Internet at: http://www.alliedtelesyn.com/corporate/media/whitepapers/epsr_wp_b.pdf-excerpt.

Extreme Networks' Ethernet Automatic Protection Switching (EAPS) Version 1, S. Shah & M. Yip, publishe3d as RFC 3619 by Network Working Group, www.ietf.org/rfc/rfc3619.txt, date Oct. 2003.

Fast Reroute Extensions to RSVP-TE for LSP Tunnels (draft-ietf-mpls-rsvp-1sp-fastreroute-03.txt); P. Pan et al.; Expiration Dec. 2003, published as Internet-Draft by Internet Engineering Task Force (IETF).

Fast Reroute Extensions to Constraint Based Routed Label Distribution Protocol (draft-vijay-mpls-crldp-fastreroute-02.txt); Vijayanand.; Expiration May 2003, published as Internet-Draft by Internet Engineering Tast Force (IETF).

"Industrial Fiber Optic Networking", Publication: RM0900515 Rev. Apr. 2004; Weed Instrument Company, Inc., (36 pages) www.weedinstrument.com Copy was provided in priority U.S. Appl. No. 10/839,8964 (MPEP 609(d)).

* cited by examiner

MULTIPOINT PROTECTED SWITCHING RING

This application incorporates by reference and claims priority to: U.S. patent application Ser. No. 10/839,864 for Protected Switching Ring subsequently issued as U.S. Pat. No. 6,928,050; two applications claimed as priority documents in the '864 application (U.S. Provisional Application 60/490,764 filed Jul. 29, 2003 and U.S. Provisional Application 60/468,325 filed May 6, 2003) U.S. provisional application 60/640,278 filed Dec. 31, 2004 for Multipoint Protected Switching Ring; and U.S. patent application Ser. No. 11/125,683 filed May 10, 2005 for Apparatus and Method for Rapid Detection of Unidirectional Breaks in a Network Ring. This application is a continuation-in-part of application Ser. No. 11/125,683 filed May 10, 2005, which is a continuation-in-part of application Ser. No. 10/839,864 filed May 6, 2004, now U.S. Pat. No. 6,928,050.

BACKGROUND OF THE INVENTION

Field of the Invention

This invention relates to communication networks, and more particularly, to an apparatus and method for Ethernet equipment in a ring topology.

As Ethernet is deployed in Metro and Access networks, and services are offered on these networks, there is a desire to maintain SONET-like resiliency (i.e. recover from a fault in less than 50 ms). One common means of providing resiliency is with a ring topology. However, Ethernet switches will not work properly if there is a ring or loop in the topology. Protocols such as IEEE 802.1d Spanning Tree Protocol (STP) or IEEE 802.1w Rapid Reconfiguration were invented to detect and remove loops. However, they are slow and cannot achieve path restoral within 50 ms as desired.

To address this problem, the IEEE developed 802.17 Resilient Packet Ring (RPR) (http://standards.ieee.org/get-ieee802/802.17.html). Others are looking at Multiprotocol Label Switching (MPLS) with Fast Reroute capabilities. Both of these approaches are quite complex. RPR requires a new Media Access Control (MAC) Layer, and MPLS requires extensive signaling. Because of the complexities, these approaches will drive up the cost of the nodes on the ring.

This invention introduces a new way (Protected Switching Ring or "PSR") of providing protection for Ethernet deployed in a ring topology with resiliency that does not require a new MAC layer, and that can be built using low cost Ethernet chips and methods.

SUMMARY

Normal 802.3 Ethernet requires a tree topology. If a ring or a loop exists, then packets will be forwarded around the ring indefinitely. STP was created to solve this problem by detecting and breaking any rings. If the ring is broken, then there is no possibility of packets being propagated forever.

This invention shows how to virtually break the ring such that all nodes can communicate with each other, and how to remove the virtual break when a real failure occurs. This is accomplished by placing intelligent nodes on the ring that work together to virtually break and restore the ring.

In PSR, the nodes communicate between and among themselves to determine when and where a break occurs. The relevant state machines for a preferred embodiment of the present invention are contained within this disclosure.

This application extends and expands on the ability of PSR to handle unidirectional breaks in various ring topologies and also discloses an additional embodiment of the present invention that allows a ring node to bridge user traffic in an advantageous manner.

DETAILED DESCRIPTION

Figure 1:
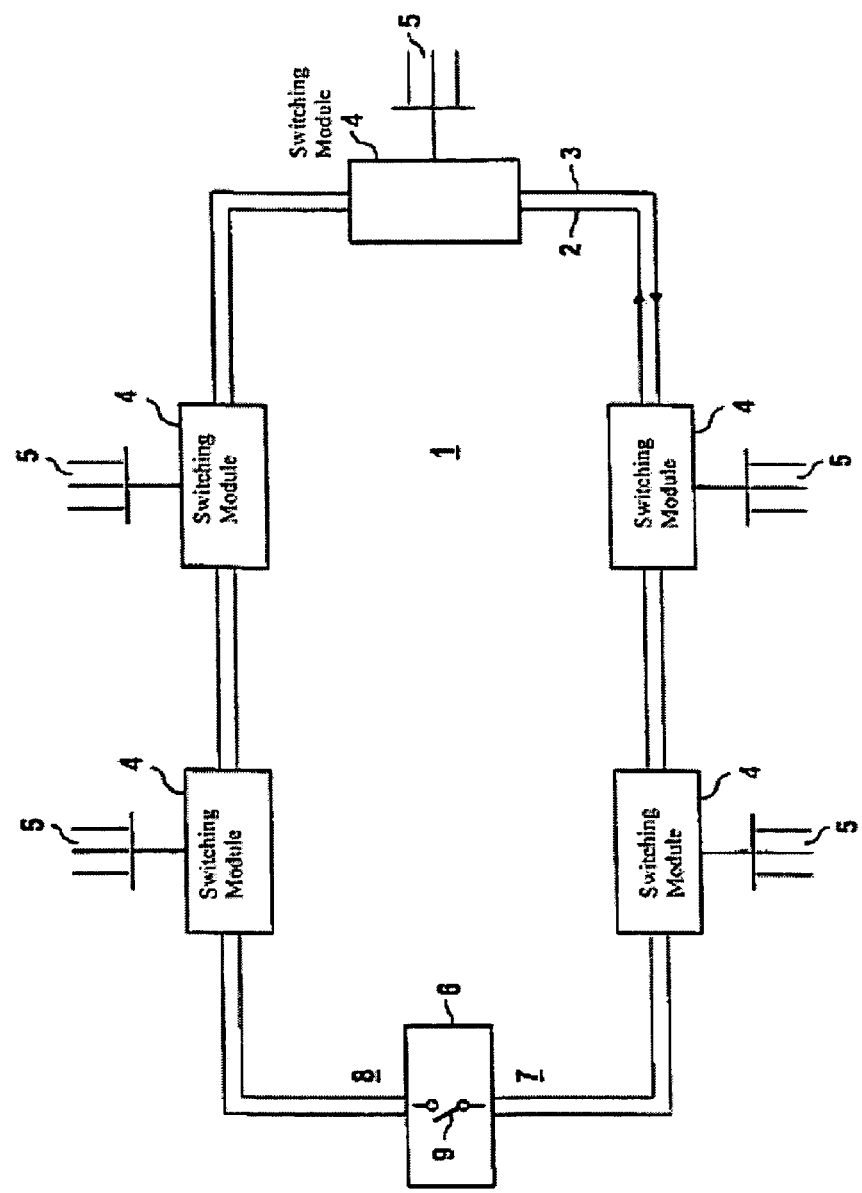
FIG. 1 shows an example of prior art.

The present invention will now be described more fully hereinafter with reference to the accompanying drawings, in order to disclose selected embodiments. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Overview

The Protected Switching Ring (PSR) enables building of partial or full ring topologies from low-cost Ethernet equipment, while providing for sub-50 millisecond recovery from equipment or link faults. PSR nodes support the transport of point-to-point port-switched connections across the ring topology. During normal, non-fault operation, one port in the ring will be blocked to user traffic, thus preventing a loop. In the event of a fault in the ring, the blocked port will be unblocked, allowing access to all nodes on the ring.

Two topologies using the present invention are described below. The first topology is the PSR Full Ring ("FR") configuration that consists of a full ring of PSR nodes. Port-switch connections can be configured between any two subscriber ports on the ring. The second topology is the PSR High-Availability (HA) configuration. This configuration provides a partial-ring extension of a SONET or RPR ring, or a partial-ring addition to existing layer-2 switching equipment. In either case, a path is engineered through the existing equipment to complete the path for the PSR protocol traffic and user data.

PSR nodes are designated as Ring Arbiters or Relays. In the first embodiment each ring contains two Ring Arbiters. The Ring Arbiters communicate with a "hello" protocol to coordinate the blocking or forwarding of user traffic. In a preferred embodiment, the PSR Ring Arbiter ports take on the role of Master or Slave on the ring according to their relative node priority. In a preferred embodiment, the priority could be a unique identifier, such as a MAC address. In a highly preferred embodiment, the priority can be the concatenation of an operator-configurable priority with the MAC address (or other unique identifier) such that the priorities of two nodes would never be equal. In either of these preferred embodiments, the reception of a HELLO with the same priority would indicate a ring with only one arbiter, where that arbiter was receiving its own HELLOs.

In general, during normal fault-free operation of two Ring Arbiters, the Slave Ring Arbiter will block one of its ring ports in order to terminate the ring loop. A ring may contain one or more Relay nodes. The Relay nodes may be distributed in any fashion around the ring, although some benefit is provided by distributing approximately equal numbers of Relays on each "side" of a full-ring configuration.

In addition to the "hello" protocol, each node performs a "discovery" protocol that allows each node to know about all the other nodes on the ring. The discovery protocol is also used to detect persistent ring faults and to generate the associated alarms. Both protocols operate at layer 2, employing reserved multi-cast MAC addresses.

In one embodiment, IP connectivity between all ring nodes is accomplished over a control VLAN used only for that purpose. This allows Telnet and a UDP-based signaling protocol to operate between any nodes on the ring. (An explanation of Telnet is not critical to the understanding of the present invention but Telnet is a terminal emulation program used with TCP/IP networks that allows remote entry of commands that are treated as if input at the network device.) Bridging techniques are used to provide the connectivity for these IP-based applications; all user traffic is transported across the ring using port-switching. As such, in this embodiment all user traffic is point-to-point across the ring; traffic from a subscriber-port/VLAN on one node is connected to a subscriber-port/VLAN on another node.

An additional embodiment of the present invention addresses a partial failure of a network link so that the communication link is lost in only one direction. Yet, another embodiment uses a single arbiter to provide a high reliability connection of user ports to an existing network ring by creating a switching ring with the arbiter and two network ring access points.

Yet another embodiment allows for bridged user traffic in the case that no switch table entry is present for that traffic.

Ring Nomenclature

When the PSR is configured, two ports are designated as the ring ports and may be called east and west ports. Also the node type is given to distinguish Ring Arbiter types and Relays (also called Ring Relays or Relay Nodes). The Ring Arbiter type may be High-Availability (HA) or Full-Ring (FR). The two Ring Arbiters on the ring must be of the same type. When speaking of a specific ring port, the partner port refers to the other port of the pair of ring ports on that Ring Arbiter or Ring Relay.

An additional distinction is made in the case of a HA Ring Arbiter. The port of the HA Ring Arbiter connected to the existing SONET or RPR ring is designated the "extension side" (ES) port. This port interfaces with the existing equipment for which we wish to extend a ring segment. The other Ring Arbiter port is referred to as the "ring side" port. It is connected to a string of one or more Ring Relays or directly to the other Ring Arbiter.

HELLO Protocol

Each PSR Ring Arbiter periodically issues a "HELLO" protocol packet out each ring port. In a preferred embodiment each PSR Ring Arbiter issues a "HELLO" protocol packet out each ring port every 10 milliseconds. The packet uses a special multicast MAC address as the destination address. The Relay nodes are configured to have the data plane pass the packet from one ring port to the other, so a Relay node adds only a small amount of delay as the packet moves from one Ring Arbiter to the other. The remote Ring Arbiter node will terminate the packet and send the packet to the control plane. The control plane uses the presence of the new packet and some control information to drive its state machine for the Ring Arbiter ports. The absence of a new HELLO message for 30 milliseconds constitutes a ring timeout. If the timeout persists for 1.5 seconds, a ring failure is declared and the appropriate alarm is issued.

The significantly longer period used as a trigger for a ring failure keeps a short intermittent problem from being deemed ring failures though the problems may be handled by the declaration of ring timeouts. In one embodiment, the ring failure is detected by loss of Discovery messages, described below. One of skill in the art could implement the ring failure to be based on the absence of HELLO messages rather than Discovery messages. One of skill in the art would appreciate that the HELLOs are not processed at the RR nodes, whereas the Discovery messages are. HELLOs therefore propagate around the ring faster than Discovery messages. A timeout threshold for loss of HELLOs can be set lower than an equivalent threshold for Discovery messages.

A ring timeout causes the state machines to transition a Slave Ring Arbiter port to a FORWARDING state. This response ensures that any loss in connectivity due to a single failure across the ring will only persist for 50 milliseconds or less.

In a preferred embodiment the sequence number in the HELLO PDU is used at the receiving Ring Arbiter to distinguish the arrival of a new HELLO PDU. Those of skill in the art will recognize that other methods could be employed to detect the arrival of a new HELLO PDU. The Relay nodes do not process the HELLO PDUs; they only forward them between ring ports.

Discovery Protocol

The discovery protocol is an optional protocol that can be implemented in order to add functionality. Note since the discovery protocol is not a necessary requirement of the state machines for any of the Ring Arbiters, Protected Switching Rings in accordance with the teachings of the present invention could be implemented without implementing the discovery protocol.

The discovery protocol also uses a special multicast destination MAC, but runs every 500 milliseconds. The discovery PDU is originated by the Ring Arbiters, appended to by intervening Relay nodes, and terminated at the remote Ring Arbiter. As the discovery PDU traverses the path between Ring Arbiters, each node in the path appends its management IP address, egress port for the PDU, and node type to the PDU. Since the discovery messages are flowing in both directions on the ring, each node on the ring can see the path of nodes to each Ring Arbiter on each of its ring ports. For example in FIG. 2, the Ring port 210 will receive a discovery message on one port directly from the RA 200 and will receive the other discovery message from the RA 225 after that discovery message passes through the ring port 220. Thus after receiving the two discovery PDUs, each ring port knows the identity of all devices between the ring port and each RA.

Additionally, as each Ring Arbiter constructs the discovery message to send out a ring port, the Ring Arbiter adds the completed node list received at its partner port. This allows every node in the PSR to know all the IP addresses of the nodes in the ring.

In the event of a ring or node failure, the Relay nodes closest to the point of failure will originate the discovery message. In other words, if a relay fails to receive a discovery PDU from its upstream neighbor (due to a link or node failure), then the relay will create and send a discovery PDU in the downstream direction. All downstream nodes will detect that the Ring Arbiter is no longer the originator of the discovery message and declare a fault alarm. If a node either does not receive a Discovery message or receives a Discovery message without a Ring Arbiter as the originator, a ring failure is declared after 1.5 seconds. The fault is cleared when the node receives a Discovery message with a Ring Arbiter as the originator.

PSR Data Plane for User Traffic

User traffic may enter and leave the PSR at any Ring Arbiter or relay node. A PSR connection defines the entry and exit points for a full-duplex flow of user traffic across the ring. This flow is defined by a pair of port/VLAN ID/PSR Node Address tuples. The connection defines a path through the ring between 2 user ports, each residing on a PSR node, configured to carry the user traffic for specific or all VLAN IDs on that port.

As the user traffic enters the ring, a ring tag is added to the packet. The ring tag is a VLAN tag and is unique on the ring. The ring tag defines a given connection between two ring nodes. At the egress node of the PSR connection, the ring tag is removed from the frame before forwarding to the user port. In this way, the VLAN tags present in the user data are transparently transported across the ring. VLAN IDs used on one user port do not interfere with IDs used on another user port.

A PSR node is either an endpoint of a given connection or a transit node for that connection. A PSR node is an endpoint for a connection if one of its user ports is specified in the definition of the given connection. The node is a transit node if neither endpoint of the connection resides on the node. In either case, a switch table used by the data plane is configured on each PSR node to either terminate one end of a given connection or to act as a transit node for that connection. When a node is a transit node for a given connection, the node simply transfers frames from one ring port to the other, based on the ring tag, without modification. When a node is an endpoint node for a given connection, the data plane directs the data arriving on a ring port to the correct user port and removes the ring tag. Conversely, the node's data plane directs user packets from the given user port with the given VLAN ID to the ring ports, adding the correct ring tag in the process.

Bridged User Traffic

An additional embodiment of the present invention allows a ring node to bridge user traffic in the case that no switch table entry is present for that traffic. In this case the PSR node must forward traffic as follows:

A. Read the source MAC address from the packet then update the FDB (forwarding database) to associate the source MAC address of the packet with the port on which it arrived, including replacing a port associated with a particular MAC address with a different port if the newest packet came through a different port. Thus, as the packet passes around the ring, each node associates the MAC address with the port that carried the packet to that node.

B. For packets with a multicast or broadcast or unknown unicast destination MAC address (unknown is one not listed in the FDB)—forward the packet to all other members of the VLAN; this will include the two ring ports and possibly one or more subscriber ports but not back to the port that received the packet.

C. For packets arriving from a subscriber port where the packet has a known destination MAC address—bridge the packet locally without entry onto the ring if the MAC address was previously associated in the FDB with another subscriber port on that node, else forward the packet to both ring ports.

D. For packets arriving from a ring port, the packets having a known destination MAC address associated with a subscriber port—forward the packet to the subscriber port AND to the partner ring port. Forwarding the packet to the partner port allows downstream nodes to associate the source MAC address with a ring port, eliminating unneeded broadcasts out subscriber ports, and making the ring act like a single bridge where all nodes learn the same MAC addresses.

E. For packets arriving from a ring port with a known destination MAC address associated with EITHER ring port—forward the packet from the ring port receiving the packet to the partner ring port. Always forwarding to the partner port eliminates the need to flush the learned addresses in the FDB when the ring experiences a fault, as described in the previous discussion of '151.

Figure 13:
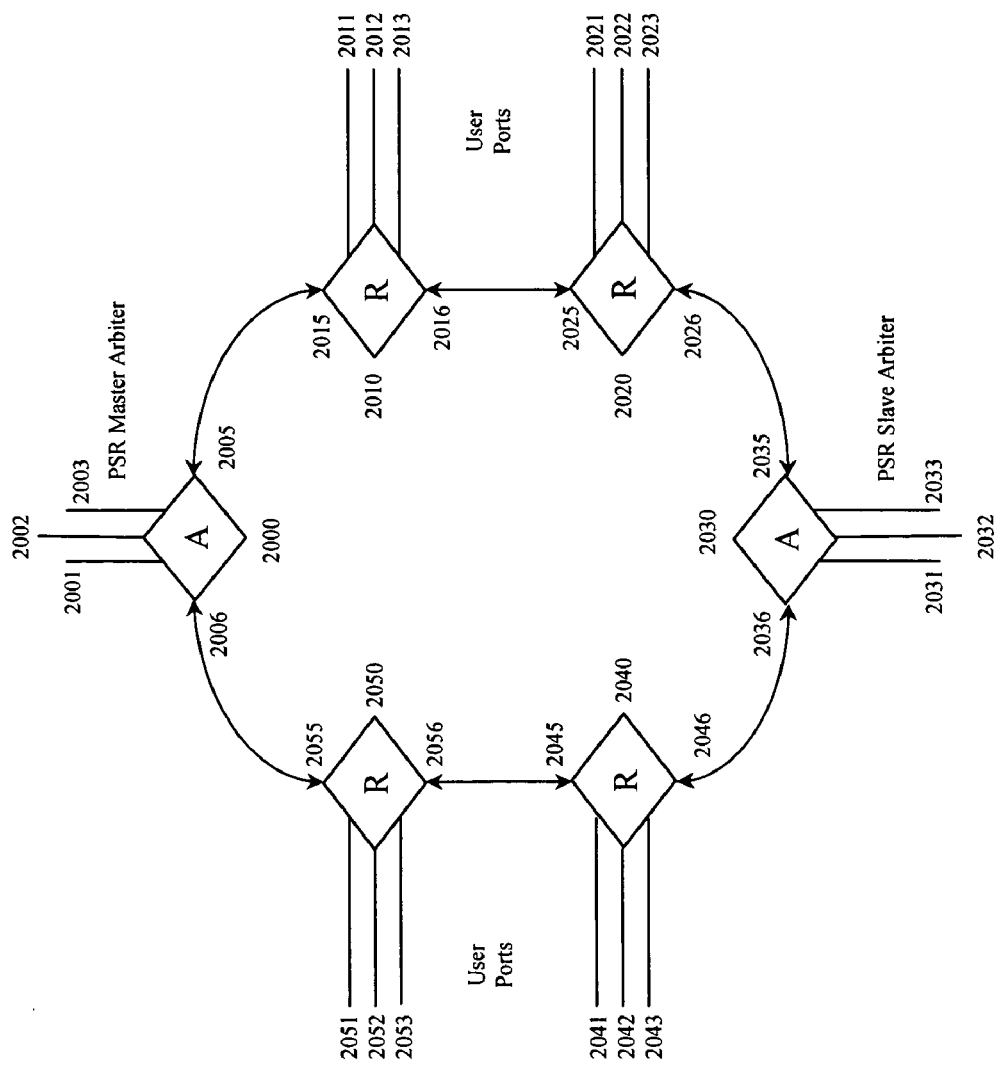
FIG. 13 provides an illustration of a protected switching ring for use in explaining the multipoint embodiment.

Here is an example using the network shown in FIG. 13. All nodes start with an empty FDB (forwarding database).

A packet with a unicast source MAC address Y and destination MAC address Z is received on port 2001 of node 2000. This MAC address was not previously entered into the FDB and is thus "unknown". The MAC address Y is placed in the FDB of node 2000 (rule A above) and the packet is forwarded on ring ports 2005 and 2006 as well as subscriber ports 2002 and 2003 (rule B above).

Node 2010 associates the previously unknown MAC address Y with its ring port 2015 (rule A above) and forwards it to user ports 2011, 2012 and 2013 and its partner ring port 2016 (rule B above). Nodes 2020, 2030, 2040 and 2050 perform analogous actions. Node 2030 is the slave arbiter and blocks the packet at ring port 2035 thus, the FDB in 2030 makes only one entry for MAC address Y.

Here are the FDBs in each of the nodes after all nodes have seen the packet:

Node 2000:
MAC Y: port 2001
Node 2010:
MAC Y: port 2015
Node 2020:
MAC Y: port 2025
Node 2030:
MAC Y: port 2036
Node 2040:
MAC Y: port 2045
Node 2050:
MAC Y: port 2055

A packet with a unicast source MAC address Z and destination MAC address Y is received on port 2041 of node 2040. MAC address Z is placed in the FDB of node (rule A above) and the packet is forwarded on ring ports 2045 and 2046 (rule C above). Since the destination MAC address Y is known, the packet is not forwarded to user ports 2042 and 2043 (rule C above).

Node 2050 receives the packet on ring port 2056. MAC address Z is placed in the FDB of node 2050 (rule A above). Since the destination MAC address Y is associated with either ring port—Node 2050 forwards the packet from the receiving ring port to the partner port (rule D above).

Node 2000 receives the packet on ring port 2006 and forwards to port 2001 and port 2005 (rule D above).

Node 2010 receives the packet on ring port 2015. MAC address Z is placed in the FDB of node 2010 (rule A above) and the packet is forwarded out port 2016 (rule E).

The process is repeated at Node 2020

The packet is blocked at port 2035 and thus does not reach node 2030 from this side of the ring. However, the packet sent from port 2046 arrives at port 2036. MAC address Z is placed in the FDB of node 2030 (rule A above). Since the destination MAC address Y is associated with either ring port—Node 2030 forwards the packet from the receiving ring port to the partner port (rule D above) but this port is blocked as 2030 is the Slave arbiter.

Here are the FDBs after all nodes have seen the packet:
Node 2000:
MAC Y: port 2001
MAC Z: port 2006
Node 2010:
MAC Y: port 2015
MAC Z: port 2015
Node 2020:
MAC Y: port 2025
MAC Z: port 2025
Node 2030:
MAC Y: port 2036
MAC Z: port 2036
Node 2040:
MAC Y: port 2045
MAC Z: port 2041
Node 2050:
MAC Y: port 2055
MAC Z: port 2056

The link between nodes 2040 and 2050 becomes cut. The slave arbiter 2030 detects the failure and unblocks port 2035.

A packet with a unicast source MAC address Z and destination MAC address Y is received on port 2041 of node 2040. The packet is forwarded on ring ports 2045 and 2046 (rule C above).

Node 2030 receives the packet on port 2036. Since the destination MAC address Y is associated with a ring port (2036), the packet is forwarded to the other ring port 2035 which is no longer blocked (rule E above). Nodes 2020 and 2010 likewise forward the packet, with no intervening flush of the FDBs required for proper operation. Nodes 2020 and 2010 do overwrite the previous FDB entries, yielding the following:
Node 2000:
MAC Y: port 2001
MAC Z: port 2006
Node 2010:
MAC Y: port 2015
MAC Z: port 2016
Node 2020:
MAC Y: port 2025
MAC Z: port 2026
Node 2030:
MAC Y: port 2036
MAC Z: port 2036
Node 2040:
MAC Y: port 2045
MAC Z: port 2041
Node 2050:
MAC Y: port 2055
MAC Z: port 2056

The rules set forth above are adapted for use in situations where the ring node may have one or more subscriber port. One of ordinary skill the art will recognize that a simpler set of rules would suffice in a network with ring nodes that have only one subscriber port. To the extent that a ring node is employed without any subscriber ports, an even simpler set of rules could be implemented using the teachings of the present invention.

One of skill in the art can appreciate that what matters is whether a data packet leaves the outgoing link for a given port. Whether a data packet is not directed to the port having the outgoing link because that outgoing link is in a non-forwarding state or whether the data packet is sent to the port but then cannot leave as the outgoing link is in a non-forwarding state is immaterial beyond the efficiency of operation within that node.

While the teachings of the present invention with respect to bridging user traffic is presented before the section on ways to detect and react to a unidirectional break, this does not imply that the user bridging aspects of the present invention cannot be used with the embodiments adapted to detect and react to unidirectional breaks. Likewise bridged user traffic could be implemented in rings without a Master Arbiter.

A control system to implement the rules of operation for the various embodiments in this application may be implemented in any of the various modes known to those of skill in the art including computer instructions, logic implemented in hardware or in any form of programmable hardware such as a programmable logic device, field programmable gate array or other analogous programmable or reprogrammable device. The process of efficiently reducing a set of rules for implementation in logic may cause the rules to be organized in such a way that it is difficult to point to a specific piece of the control system that implements a specific rule set forth in this disclosure. However, the specific organization of the implemented rules is not relevant to the issue of whether or not the rules taught by this disclosure have been implemented.

PSR Control Plane for Control Traffic

A PSR requires a mechanism to transport HELLO PDUs, discovery PDUs, and IP traffic for ring control applications between PSR nodes. While in a preferred embodiment user traffic transport is transported using switching techniques, in a preferred embodiment the control functions are transported using bridging techniques. By using bridging techniques, full PSR node control connectivity is attained with all nodes appearing on the same IP subnet. This makes configuration much simpler.

One ring tag is reserved for PSR control traffic. The data plane uses learning procedures and forwarding table lookups to direct control traffic to the correct PSR node. Note that the use of learning procedures and forwarding table lookups for the direct control traffic imposes an overhead burden that is orders of magnitude smaller than the overhead needed to use learning techniques for user data traffic. In the preferred embodiment the HELLO and discovery messages use known multicast MAC addresses and thus do not add additional learned database entries to be forwarded. Flushing is not needed for the control traffic upon failure, recovery, or reconfiguration of the ring, as the new port entries are learned from bidirectional traffic after a short period of time.

While the use of bridging for control traffic is preferred, it is not required in order to implement the present invention. The present invention could be implemented to use switching techniques for data packets and some or all types of control traffic. Care must be taken in creating this variation that the control traffic described in this application as passing when data packets are blocked, must be allowed to pass.

Example Recovery for Full Ring

Fault Detection

Figure 3:
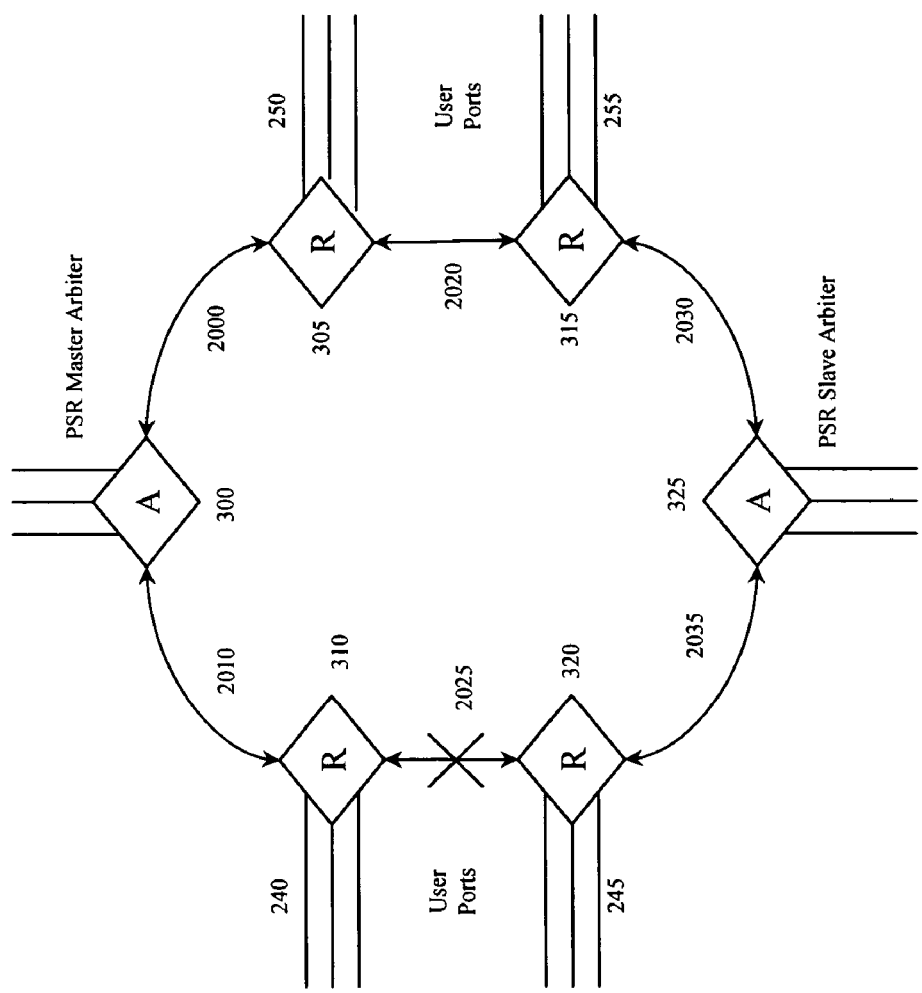
FIG. 3 shows an example Protected Switching Ring in the Full Ring mode during a failure.

FIG. 3 shows a full ring where the link 1325 fails between nodes 310 and 320. This means that RA nodes 300 and 325 are unable to communicate with each other via the left hand side of the ring. Prior to the failure, assume that RA node 325, the Slave Ring Arbiter, is blocking traffic on link 1330 (thus no counterclockwise communication on 1330) and forwarding traffic on link 1335. Also, any user traffic arriving on link 1330 is discarded. So clockwise traffic on 1330 is discarded at the 1330 side of RA 325. Communications to subscriber ports connected to RA 325 reach those ports through counterclockwise communication over link 1335 to RA 325.

Assuming RA node 300 was the Master Ring Arbiter, when RA node 325 detects the loss of communication; RA node 325 will start forwarding traffic to the right hand side of the ring onto link 1330 and accepting user traffic arriving on link 1330 and relaying the traffic to link 1335 and to the subscriber ports of RA 325. This will restore communications between all of the nodes on the ring. At this point, RA 325 is forwarding traffic on both ring ports. The ring port that is facing link 1335 is in MASTER FORWARDING state, and the ring port that is facing link 1330 is in SLAVE FORWARDING state.

Link Restoral

When link 1325 is restored, RA node 325 needs to block one of its ring ports to prevent a loop in the ring. When RA node 325 receives the first HELLO on link 1335 (due to the restoration of link 1325), RA node 325 will see that the partner port to the port that is facing link 1335 is in SLAVE FORWARDING state. RA node 325 will move the port that is facing link 1335 to the BLOCKING state. Assuming that the Ring ports of nodes 310 and 320 connected to link 1325 went to an OPER DOWN state during the failure, the TIMING state in the relay nodes 310 and 320 will prevent forwarding of traffic until the Slave Ring Arbiter has time to switch from MASTER FORWARDING to BLOCKING on the 325 side of the Ring Arbiter. OPER DOWN is an indication from the physical or transport layer that a link is not operational. It is normally based on the detection of loss or corruption of the incoming electrical or optical signal.

The advance to the TIMING state is triggered by the reception of a HELLO message. This TIMING state delay in the resumption of operation of relay nodes 310 and 320 prevents duplicate packets from reaching a given destination when the failed link is restored. To illustrate the value of this delay in the Ring Relay ports, consider a message coming to Ring Relay 305 to a subscriber port connected with Ring Relay 310 just before link 1325 is restored. Ring Relay 305 operating normally will send the same message onto link 1300 and link 1320. The message traveling counterclockwise reaches Ring Relay 310 in a conventional way. The message traveling clockwise to Ring Relay 310 will pass through Ring Arbiter 325 onto link 1335 as the west Port is operating in MASTER FORWARDING. When link 1325 is restored, there is a path for a duplicate message to cross link 1325 to Ring Relay 310. This potential is eliminated if the Ring Relay ports undergo a suitable delay between receipt of the first HELLO and the ultimate state of FORWARDING. Note that the HELLO messages from Ring Arbiter 300 to Ring Arbiter 325 and from Ring Arbiter 325 to Ring Arbiter 300 will pass over link 1325 as soon as it is restored as the HELLO messages are not blocked at any port in any state.

The preferred embodiments disclose using a timing delay to ensure that a port progressing from OPER DOWN to operational delays sending data packets long enough for the Slave arbiter to impose a virtual break. One of skill in the art will recognize that the use of the timer could be replaced by a control signal sent by the Slave arbiter after it has successfully imposed the virtual break. In either case, the port does not go to fully operational until after the virtual break has been imposed to preclude the creation of a ring for data packets.

Example Recovery for HA Ring

Fault Detection

Figure 4:
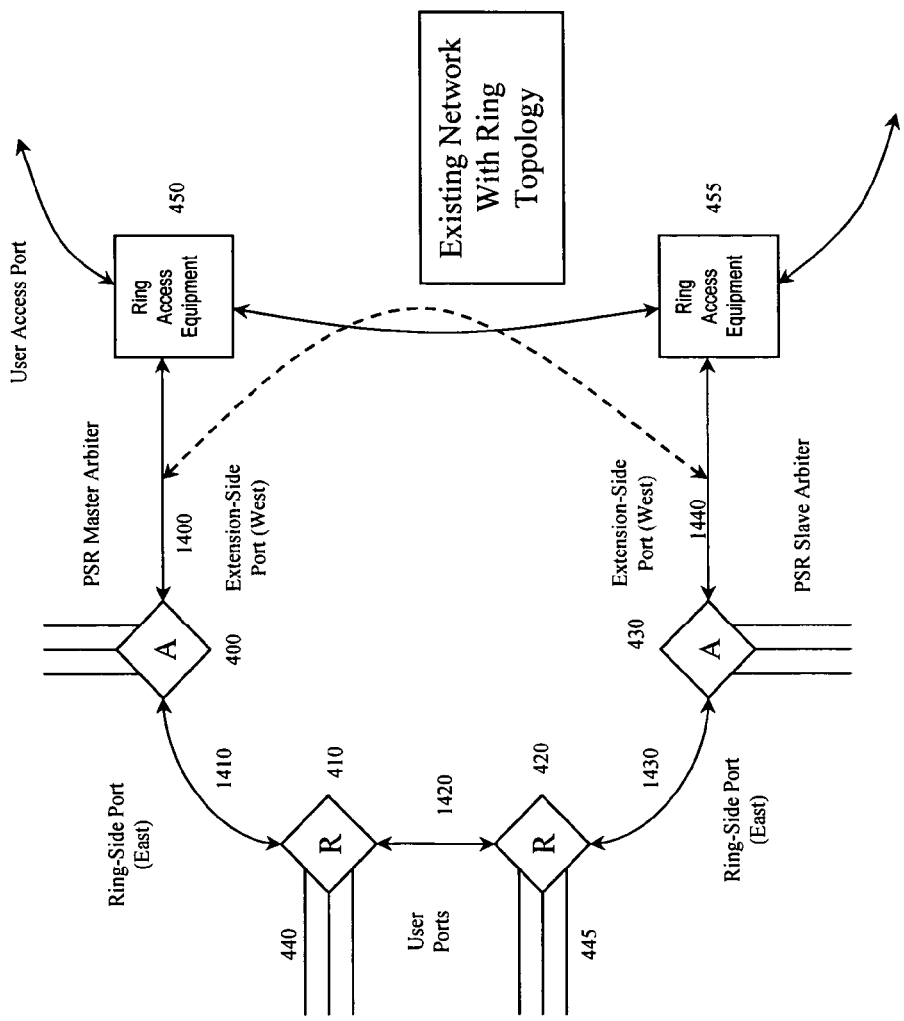
FIG. 4 shows an example Protected Switching Ring in the High Availability mode in normal operation.
Figure 5:
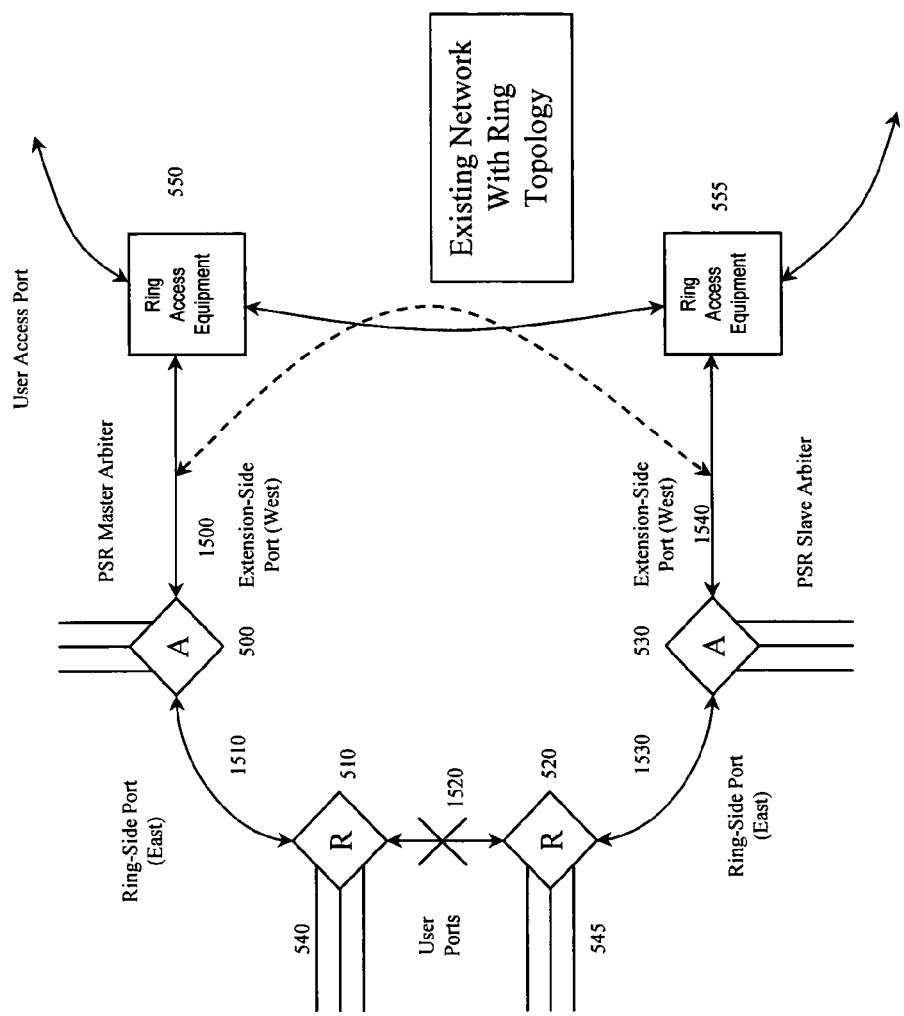
FIG. 5 shows an example Protected Switching Ring in the High Availability mode during a failure.

FIG. 4 shows a HA ring under normal fault-free operation. The ES Slave port 1440 is in the BLOCKING state to prevent a ring loop. FIG. 5 shows a HA ring where the link 1520, between nodes 510 and 520, fails. As for the full ring case, the bidirectional failure of link 1520 means that the Ring Arbiter nodes 500 and 530 are unable to communicate over the left side (Ring Side) portion of the HA ring. Assuming Ring Arbiter node 530 is the Slave, its ES port (the facing link 1540) would be un-blocked when the failure is detected. Fault detection and subsequent un-blocking of the Slave Ring Arbiter port is fundamentally the same as for the full ring case described above.

Link Restoral

In a preferred embodiment, the HA ring favors the Ring Side once the fault is removed. Instead of leaving the Slave Ring Arbiter ES port (the port facing link 1540) in the forwarding state and blocking the Ring Side port (the port facing link 1530), the HA Slave Ring Arbiter 530 always returns to a FORWARDING state on the Ring Side segment and blocks the ES port.

The Ring Side segment of the HA ring is favored in order to minimize HA ring traffic on the existing SONET or RPR ring as this will cut some of the user traffic on the SONET ring segment between the Ring Access Equipment as one direction will be blocked (thus counterclockwise traffic from port 1440 will be blocked while clockwise traffic from 1400 will continue to travel on the SONET Ring.

Nomenclature for State Diagrams

In the following descriptions, "isMaster" is based on the last received HELLO. If no HELLO was ever received on the port, then isMaster is based on the partner's last HELLO. If no HELLOs have ever been received by either port, then isMaster is "true". The Boolean variable "isSlave" is the logical negation of "isMaster".

The term "PartnerHelloTimeout" indicates that the partner port's age timer has timed out. The designation "RxHello<Node" means a HELLO message has been received whose priority is less than that of the receiving node. This event would cause the receiving node to consider itself a Master.

Full Ring Mode—Ring Arbiter

Figure 6:
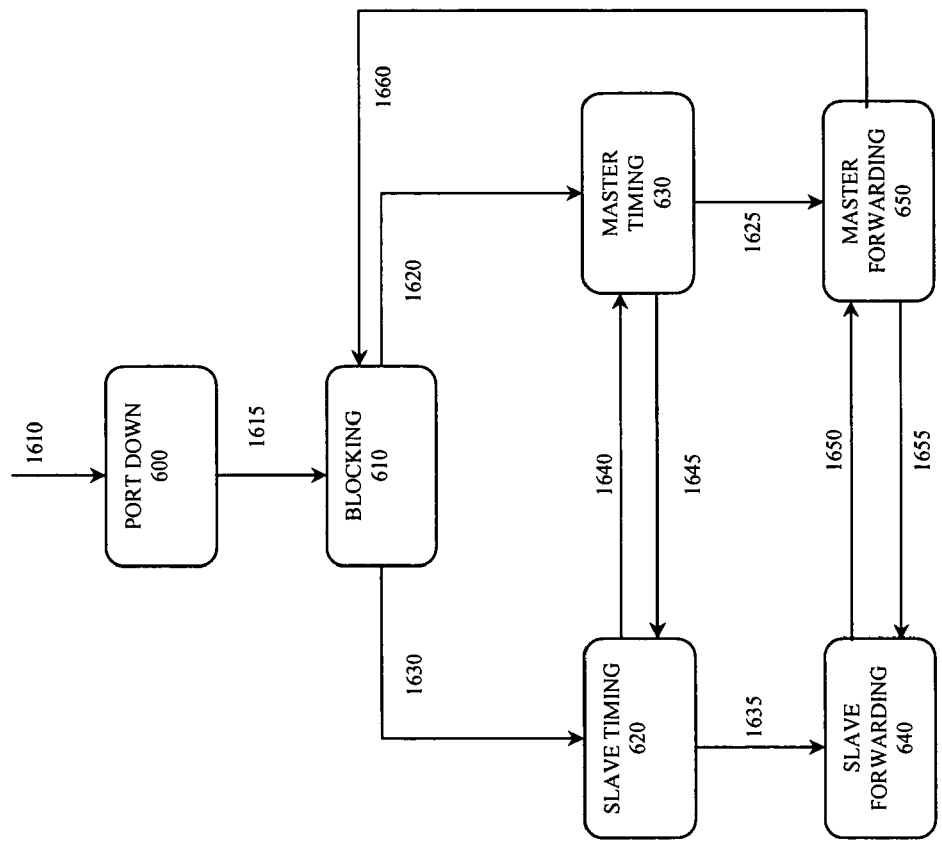
FIG. 6 shows the state machine for a Ring Arbiter node in the Full Ring mode.

FIG. 6 shows the state diagram for a RA node. Each of the two ports on an RA node runs a copy of this state machine.

Description of States

The state machine of FIG. 6 has the following states.

TABLE A

| Number | State | Description |
|---|---|---|
| 600 | PORT DOWN | The port is operationally down or has just been initialized. Entered from any state. |
| 610 | BLOCKING | The node is sending HELLOs, but not forwarding data traffic. |
| 620 | SLAVE TIMING | Node knows that it is a Slave, but port is waiting for a timer to expire before moving to a forwarding state. |
| 630 | MASTER TIMING | Node knows that it is a Master, but port is waiting for a timer to expire before moving to a forwarding state. |
| 640 | SLAVE FORWARDING | The port on a Slave Node is forwarding packets |
| 650 | MASTER FORWARDING | The port on a Master Node is forwarding packets |

Description of State Transitions

The table below describes the transitions of the state machine shown in FIG. 6.

Note the fd timer reference below runs using a time that is a small fraction of the time used for the age timers in the RA and Relay nodes. This ensures that the relays are timed for a period long enough after the expiration of the fd timer for the loop to be broken. For example, one embodiment uses a 10 millisecond timer for the RA and Relay nodes and the fd timer at just one "tick" (a single 10 millisecond delay). This 10 millisecond interval is a small fraction of the 30 millisecond interval used to detect a ring timeout when a new HELLO message does not arrive within that interval.

Note that the state machine for ring arbiters in the preferred embodiment does not wait indefinitely to see a HELLO as long as the ports of the ring arbiter are operationally UP. The goal is to let the parts of the network ring operate even if other portions of the network ring operate.

TABLE B

| Num | Event | Action |
|---|---|---|
| 1610 | port operationally down OR init | block user traffic, cancel all timers |
| 1615 | port operationally up | start age timer |
| 1620 | age timer expires OR RxHello < Node | start fd timer |
| 1625 | fd timer expires | restart age timer, forward user traffic |
| 1630 | RxHello > Node | start fd timer |
| 1635 | fd timer expires AND partner not SLAVE FORWARD | restart age timer, forward user traffic |
| 1640 | age timer expires OR RxHello < Node | restart fd, age timer |
| 1645 | RxHello > Node | restart fd timer |
| 1650 | Age timer expires OR RxHello < Node | restart age timer |
| 1655 | RxHello > Node AND partner not SLAVE FORWARD | restart age timer |
| 1660 | RxHello > Node AND partner SLAVE FORWARD | restart age timer |

The following table shows the complete state transitions for the Full-Ring Arbiter as shown in FIG. 6.

TABLE C

| Current State Event | PORT DOWN 600 | BLOCKED 610 | SLAVE TIMING 620 | MASTER TIMING 630 | SLAVE FORWARDING 640 | MASTER FORWARDING 650 |
|---|---|---|---|---|---|---|
| Oper Down | N/A | PORT DOWN | PORT DOWN | PORT DOWN | PORT DOWN | PORT DOWN |
| Oper Up | BLOCKED | N/A | N/A | N/A | N/A | N/A |
| Age Timer Expires | N/A | MASTER TIMING | MASTER TIMING | MASTER TIMING | MASTER FORWARDING | MASTER FORWARDING |
| fd Timer Expires | N/A | N/A | N/A | MASTER FORWARDING | N/A | N/A |
| fd timer Expires AND Partner SLAVE FORWARDING | N/A | N/A | SLAVE TIMING | N/A | N/A | N/A |
| fd Timer Expires AND Partner not SLAVE FORWARDING | N/A | N/A | SLAVE FORWARDING | N/A | N/A | N/A |
| RxHello < Node | N/A | MASTER TIMING | MASTER TIMING | MASTER TIMING | MASTER FORWARDING | MASTER FORWARDING |
| RxHello ≥ Node | N/A | SLAVE TIMING | SLAVE TIMING | SLAVE TIMING | N/A | N/A |
| RxHello ≥ Node AND Partner SLAVE FORWARDING | N/A | N/A | N/A | N/A | N/A | BLOCKED |
| RxHello ≥ Node AND Partner not SLAVE FORWARDING | N/A | N/A | N/A | N/A | SLAVE FORWARDING | SLAVE FORWARDING |

In a preferred embodiment, every 10 milliseconds, the two ports are checked in the same order. The combination of variations in when the HELLOs were generated plus transit delays may cause one HELLO on one port to arrive before the other HELLO on the other port. In any case, since one port is checked before the other then the other, it always appears as though one HELLO arrives before the other. The order that the ports are checked does affect which Slave port is set to BLOCKING on the full ring.

One of skill in the art will recognize that any embodiment that does not check one port before the other would need to address the case of two HELLOs arriving essentially simultaneously at the two ports.

Description of State Transitions

The table below describes the transitions of the state machine shown in FIG. 7.

TABLE F

| Number | Event | Action |
|---|---|---|
| 1710 | port operationally down OR init | block user traffic, cancel all timers |

TABLE D

| Time | Port A | Input | State Change | Port B | Input | State Change |
|---|---|---|---|---|---|---|
| 1 | Port Down | Port up | 1615 to Blocking | Port Down | Port up | 1615 to Blocking |
| HELLOs generated by other RA and sent towards ports A and B of this RA. One HELLO arrives slightly before the other. | | | | | | |
| 2 | Blocking | RxHello > node | 1630 to Slave Timing | Blocking | | |
| 3 | Slave Timing | | | Blocking | RxHello > node | 1630 to Slave Timing |
| 4 | Slave Timing | fd timer expires and partner not SLAVE FORWARD | 1635 to SLAVE FORWARD | Slave Timing | | |
| 5 | Slave forward | | | Slave Timing | [cannot advance to Slave Forward as partner is in Slave Forward] | |
| 6 | | | Link breaks | | | |
| 7 | Slave Forward | Link breaks, age timer expires | 1650 to Master Forwarding | Slave Timing | | |
| 8 | Master Forward | | | Slave Timing | fd timer expires and partner not SLAVE FORWARD | 1635 to SLAVE FORWARD |
| 9 | Master Forward | | | Slave Forward | | |
| 10 | | | Link Restored | | | |
| 11 | Master Forward | RxHello > Node and partner Slave Forward | 1660 to Blocking | Slave Forward | | |
| 12 | Blocking | RxHello > Node | 1630 to Slave Timing | Slave Forward | | |

This continues until a port goes down, a link goes down, or the node number of the other RA changes to become less than Node (normally this would take a reconfiguration from the operator or the substitution of another RA unit).

Full Ring Mode—Ring Relay

Figure 7:
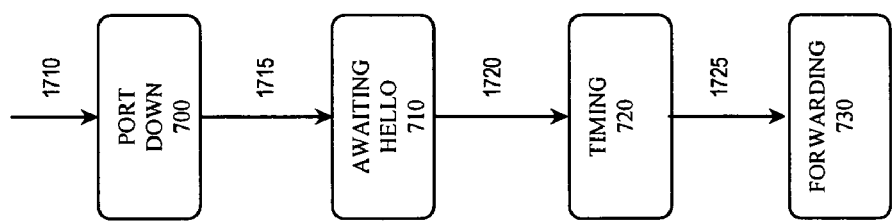
FIG. 7 shows the state machine for a Ring Relay node in the Full Ring mode.

FIG. 7 shows the state machine for a Ring Relay node.

Description of States

The state machine of FIG. 7 has the following states.

TABLE E

| Number | State | Description |
|---|---|---|
| 700 | PORT DOWN | The port is operationally down or has just been initialized. Entered from any state on an indication of the port going down due to a loss of signal or other similar alarm. |
| 710 | AWAITING HELLO | Port is operationally up, but no HELLO has been received |
| 720 | TIMING | The port is waiting for the fd timer to expire |
| 730 | FORWARDING | Normal forwarding. |

TABLE F-continued

| Number | Event | Action |
|---|---|---|
| 1715 | port operationally up | start age timer |
| 1720 | age timer expires OR RxHello | start fd timer |
| 1725 | fd timer expires | forward user traffic |

High Availability Mode—Ring Arbiter—Ring Side

Figure 8:
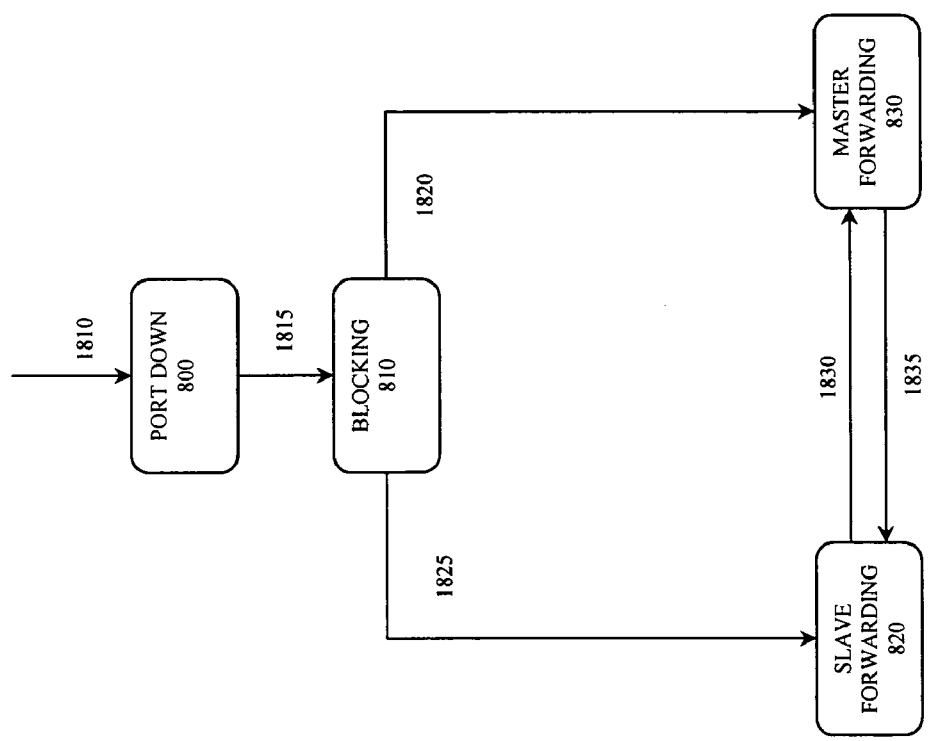
FIG. 8 shows the state machine for the Ring Side of a Ring Arbiter node in the High Availability mode.

FIG. 8 shows the state machine for the Ring Side (RS) of a Ring Arbiter in HA mode.

Description of States

The state machine of FIG. 8 has the following states.

TABLE G

| Number | State | Description |
|---|---|---|
| 800 | PORT DOWN | The port is operationally down or has just been initialized. Entered from any state. |

TABLE G-continued

| Number | State | Description |
|---|---|---|
| 810 | BLOCKING | The port is sending HELLOs, but is not forwarding data traffic. |
| 820 | SLAVE FORWARDING | The port on a Slave Node is forwarding packets |
| 830 | MASTER FORWARDING | The port on a Master Node is forwarding packets |

Description of State Transitions

The table below describes the transitions of the state machine shown in FIG. 8.

TABLE H

| Number | Event | Action |
|---|---|---|
| 1810 | port operationally down OR init | block user traffic, cancel age timer |
| 1815 | port operationally up | start age timer |
| 1820 | (age timer expires AND isMaster) OR RxHello < Node | Forward user traffic |
| 1825 | (age timer expires AND isSlave) OR RxHello > Node | Forward user traffic |
| 1830 | RxHello < Node | No action |
| 1835 | RxHello > Node | No action |

High Availability Mode—Ring Arbiter—Extension Side

Figure 9:
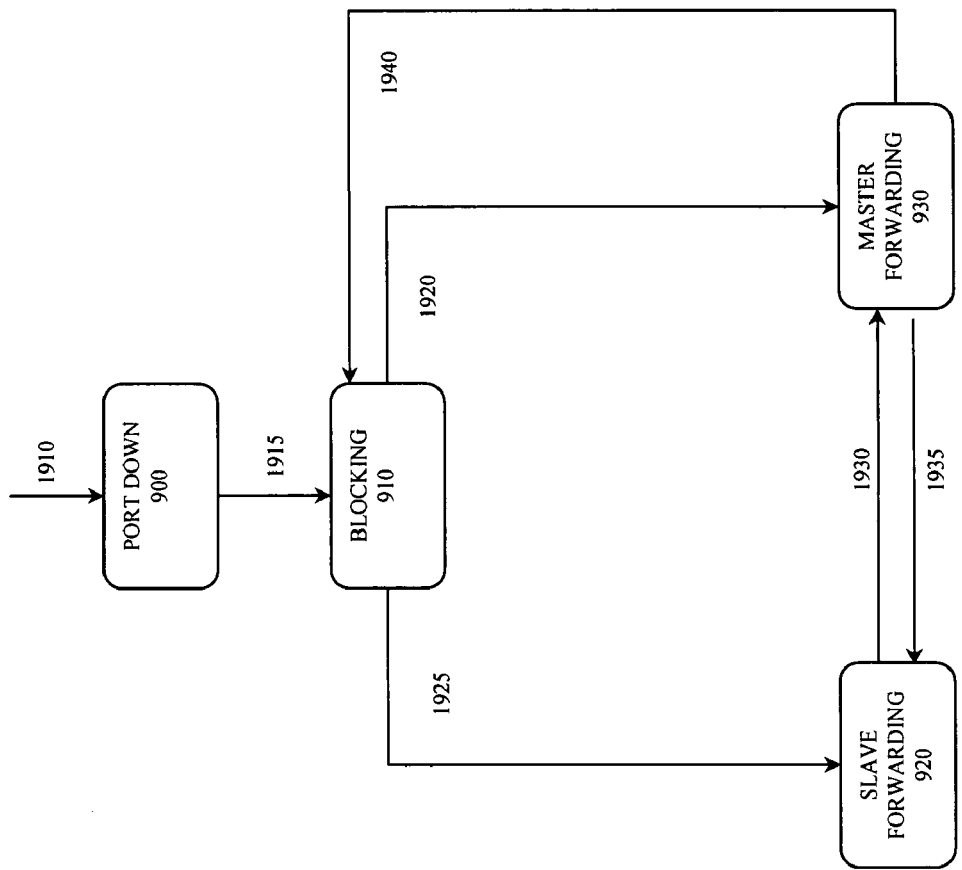
FIG. 9 shows the state machine for the Extension Side of a Ring Arbiter node in the High Availability mode.

FIG. 9 shows the state machine for the Extension Side (ES) of a Ring Arbiter in HA mode.

Description of States

The state machine of FIG. 9 has the following states.

TABLE I

| Number | State | Description |
|---|---|---|
| 900 | PORT DOWN | The port is operationally down or has just been initialized. Entered from any state. |
| 910 | BLOCKING | The node is sending HELLOs, but not forwarding data traffic. |
| 920 | SLAVE FORWARDING | The port on a Slave Node is forwarding packets |
| 930 | MASTER FORWARDING | The port on a Master Node is forwarding packets |

Description of State Transitions

The table below describes the transitions of the state machine shown in FIG. 9.

TABLE J

| Number | Event | Action |
|---|---|---|
| 1910 | port operationally down OR init | block user traffic, cancel age timer |
| 1915 | port operationally up | start age timer |
| 1920 | (age timer expires AND isMaster) OR RxHello < Node | forward user traffic |
| 1925 | (age timer expires AND isSlave) | forward user traffic |
| 1930 | RxHello < Node | continue forwarding user traffic |
| 1935 | RxHello > Node AND PartnerHelloTimeout | continue forwarding user traffic |
| 1940 | RxHello > Node AND NOT PartnerHelloTimeout | block user traffic, start age timer |
| 1945 | RxHello > Node AND NOT PartnerHelloTimeout | block user traffic, start age timer |

As shown in the sequence of events reported in the table below, the RS ports of Arbiters are always forwarding, unless the ports are OPER DOWN. The point of interest is the state of the ES port of the Slave Arbiter. In essence, the ES Slave port is FORWARDING if is a HELLO timeout on either the RS or ES.

TABLE K

| | Port Status (before trigger) | | | | | |
|---|---|---|---|---|---|---|
| TIME | 500 RS | 500 ES | 530 RS | 530 ES | Trigger | Reaction |
| 1 | 800 | 900 | 800 | 900 | 500 initialized | 500 RS goes Blocking, 500 ES Goes to Blocking |
| 2 | 810 | 910 | 800 | 900 | 530 initialized | 530 RS goes Blocking, 530 ES Goes to Blocking |
| 3 | 810 | 910 | 810 | 910 | 500 receives HELLO from 530 and RxHello < node | 500 RS state change 1820 to Master Forwarding 500 ES state change 1920 to Master Forwarding |
| 4 | 810 | 910 | 830 | 930 | 530 received HELLO from 500 and RxHello > node | 530 RS state change 1825 to Slave Forwarding 530 ES does not leave Blocking unless RS or ES has HELLO timeout |
| 5 | 820 | 910 | 830 | 930 | | Continues operation with the virtual break in the HA ring at the ES of the Slave (RA 500). |
| 6 | 820 | 910 | 830 | 930 | Break in link 1520 (ring side) | |
| 7 | 820 | 910 | 830 | 930 | RxHellos stop coming on RS | 500 RS no change 530 ES state change 1925 to Slave Forwarding |
| 8 | 820 | 920 | 830 | 930 | | All four ports forward traffic while there is a physical break |

TABLE K-continued

| | Port Status (before trigger) | | | | | |
|---|---|---|---|---|---|---|
| TIME | 500 RS | 500 ES | 530 RS | 530 ES | Trigger | Reaction |
| 9 | 820 | 920 | 830 | 930 | Break fixed | |
| 10 | 820 | 920 | 830 | 930 | RxHello received at 530 RS and > node | 530 ES state change 1945 to blocking |
| 11 | 820 | 920 | 830 | | | Continues operation with virtual break. |
| 12 | 820 | 910 | 830 | 930 | Link break ES | |
| 13 | 820 | 910 | 830 | 930 | HELLOs stop on ES side of both RA units | 530 ES notes that its age timer expires and it is Slave and has state change 1925 to Slave forwarding |
| 14 | 820 | 920 | 830 | 930 | | All four ports forward traffic while there is a physical break |
| 15 | 820 | 920 | 830 | 930 | Break fixed | |
| 16 | 820 | 920 | 830 | 930 | 530 ES receives RxHellos > node and not PartnerHelloTimeout | 530 ES moves along state transition 1945 to Blocking |
| 17 | 820 | 910 | 830 | 930 | | Until next break, port down, or switch in node numbers sufficient to change Master/Slave relationship. |

ADDITIONAL ALTERNATIVE EMBODIMENTS

Unidirectional OPER DOWN Break on Full or High-Availability Rings

The control system described above assumes that a break in a network ring will be a bidirectional break as it connects both the clockwise and counterclockwise virtual breaks upon failure to receive a HELLO. This bidirectional response could cause a loop in the event of a unidirectional failure.

Figure 2:
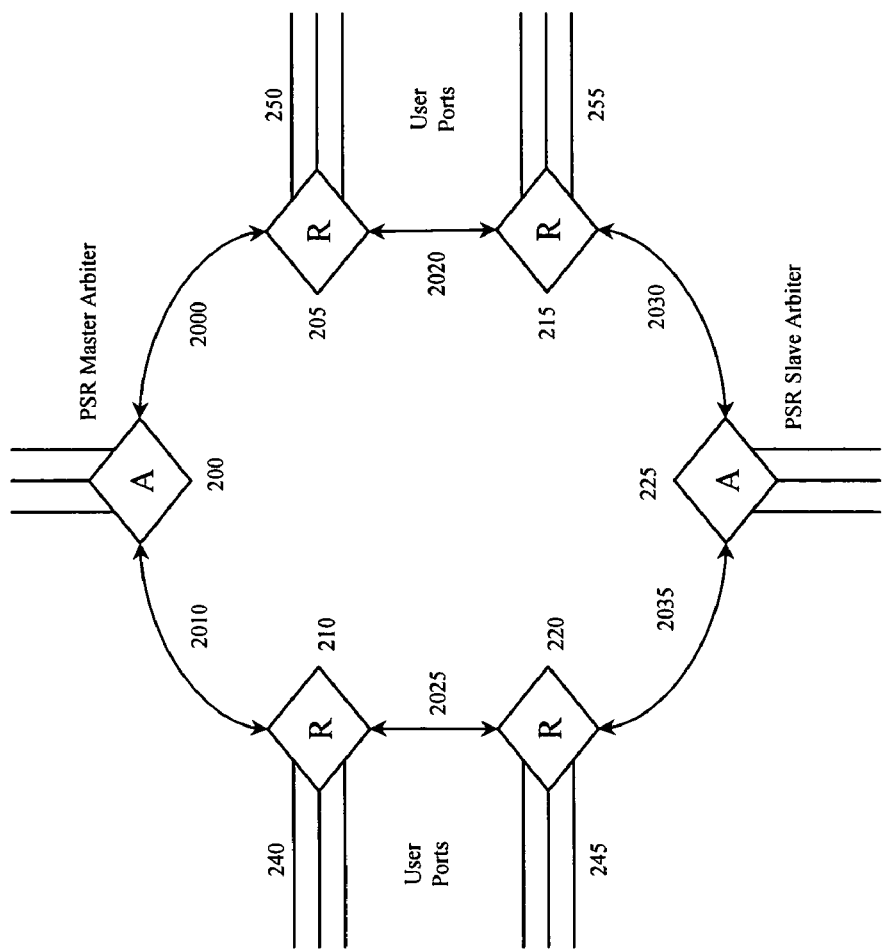
FIG. 2 shows an example Protected Switching Ring in the Full Ring mode in normal operation.
Figure 10:
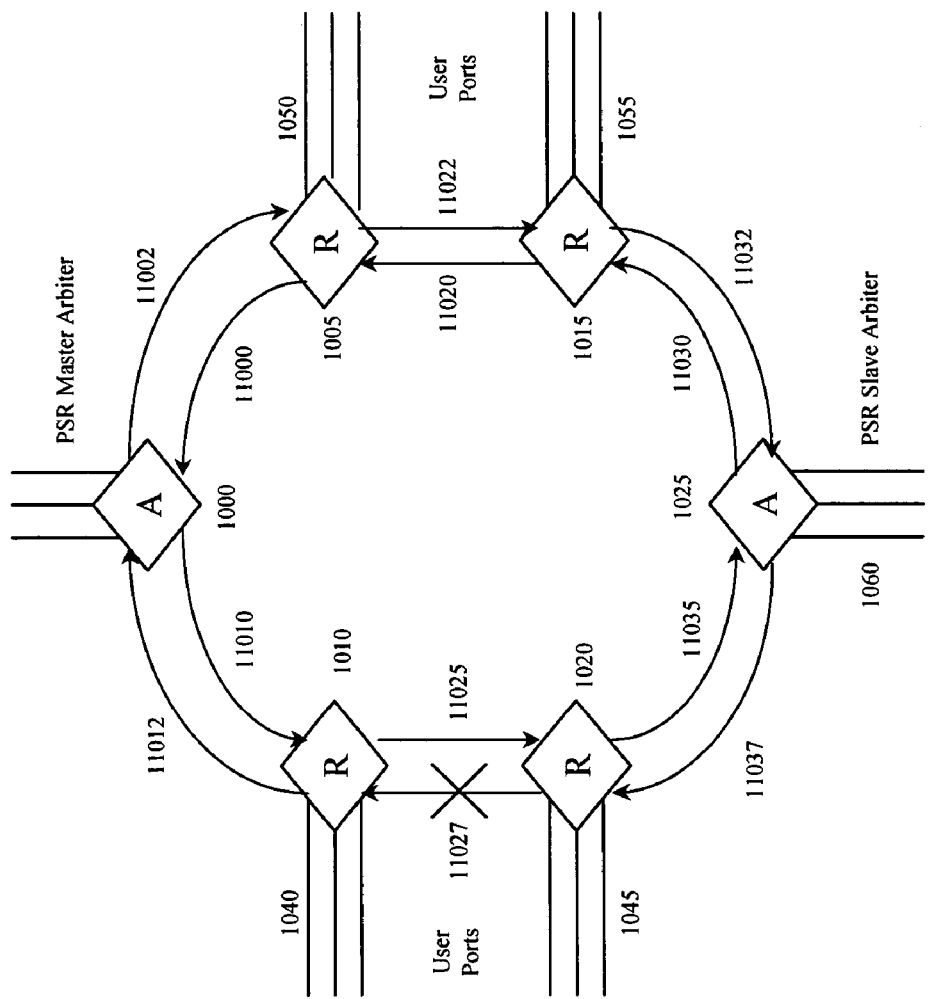
FIG. 10 illustrates a unidirectional ring break.

FIG. 10, adds additional detail to the drawing shown in FIG. 2. More specifically, the links are shown in their unidirectional components rather than as bidirectional links.

For example, when the network ring is fully operational, and the Slave Arbiter has imposed a virtual break on the west ring port, Master Arbiter 1000 can receive HELLOs from Slave Arbiter 1025 via link 11037, Relay 1020, link 11027, Relay 1010, and link 11012. Likewise, Slave Arbiter 1025 can receive HELLOs from Master Arbiter 1000 via link 11010, Relay 1010, link 11025, Relay 1020, and link 11035.

If link 11027 was cut but link 11025 was left in service, then the west port on Master Arbiter 1000 would soon stop receiving HELLOs from Slave Arbiter 1025, while west port of Slave Arbiter 1025 continued to receive HELLOs from Master Arbiter 1000. In the previously described embodiment, this unidirectional cut at link 11027 would not trigger the Slave Arbiter 1025 to unblock as it continues to receive HELLOs from Master Arbiter 1000 as these HELLOs can still travel across intact link 11025. Thus Ring Relay 1020 as well as connected subscriber ports 1045 would be unable to send data to any node on the ring as Slave Arbiter 1025 is still blocking data. (Note: as link 11025 is intact, Ring Relay 1020 and subscriber ports 1045 can still receive data packets)

One alternative embodiment is to react to a port going to an OPER DOWN state by stopping the transmission of HELLOs and all data from that port in the opposite direction, effectively creating an imposed unidirectional break in the other direction. Hence when ring relay 1010 observes an OPER DOWN associated with link 11027, Ring Relay 1010 would stop sending HELLOs and all data on link 11025. After Slave Arbiter 1025 fails to receive HELLOs in an allotted time, the Slave Arbiter 1025 would remove the virtual break on its west side to allow data traffic from link 11035 to proceed towards link 11030 or the user ports 1060 and to allow traffic from link 11032 or user ports 1060 to proceed onto link 11037, thus putting Ring Relay 1020 back into data communication with the other ring nodes.

Another Solution to Unidirectional Breaks on Full or High-Availability Rings

In some cases, the OPER state of a ring port may not be DOWN, event though a unidirectional failure is present. One example of this type of situation occurs when a leased TDM link (such as a T1;, DS3, or OC-n) is interrupted by the service provider such that there is no physical layer fault. Likewise, a Gigabit Ethernet link with auto-negotiation disabled may not report link failure in the case of a unidirectional break. In either case, no data can traverse the link in one direction.

A more comprehensive solution to the risk of a unidirectional break is one that reacts to either an OPER DOWN or an extended break in the receipt of HELLO messages. In this embodiment a Ring Relay would respond to either an OPER DOWN on a receiver or a gap of more than a set time period without receiving a HELLO on a particular receiver to declare a link failure. For example, a gap of 30 milliseconds (three ticks of a ten millisecond clock) is used in one embodiment as the indication of too long a period without a HELLO on a receiver link.

After detecting either type of failure, a Ring Relay does the following:

Creates a bidirectional break by blocking data on the outgoing link on the same port as the receiver link deemed to have failed. (Note that the Ring Relay does not know whether the break discerned on the receiver link is a bidirectional break or a unidirectional break but handles all breaks as a unidirectional break. Thus the Ring Relay may impose a redundant break on a broken transmitter side link but this is harmless.)

Creates a break at the receive link that is deemed to have failed. This seems redundant but imposing a break on a broken link allows the imposed break to remain for a period after the real break is removed so that the Slave Arbiter has a chance to re-impose a virtual break before the imposed break is removed at the Ring Relay.

Sends flagged HELLO protocol packets on the outgoing link on the same port as the receiver link deemed to have failed. These flagged HELLO protocol packets serve two purposes. They serve as HELLO protocol packets so that other nodes do not experience (or maintain) the state of a HELLO timeout. These flagged HELLO protocol packets are distinguishable from normal Arbiter generated protocol packets and thus convey to the Slave Arbiter that a bidirectional break is being imposed and thus the Slave Arbiter needs to remove the virtual break.

Blocks HELLO messages from the transmit link on the partner port relative to the port with the detected failure on the receive link. Sends flagged HELLO messages on the transmit link on the partner port. Note that as Ring Relays are provided with generic control logic which does not need to be configured to indicate the direction of the Slave Arbiter, the Ring Relay operates without needing to know which direction is the Slave Arbiter and which direction is the Master Arbiter. Thus, upon detecting a failure, the Ring Relay sends flagged HELLO messages in both directions to ensure that the Slave Arbiter receives the indication that the Slave Arbiter needs to remove the virtual break.

In the example using FIG. 10, when Ring Relay node 1010 experiences a HELLO timeout with no OPER DOWN on receiver link 11027, Ring Relay node 1010 will block all user traffic onto link 11025 and from link 11027 to thus make a what might be a unidirectional break on 11027 into a bidirectional break. The Ring Relay 1010 will send out flagged HELLO messages on both link 11012 and onto link 11025 with the "regenerate" flag set (the normal HELLO messages from Master Arbiter 1000 will be blocked at 1010 so only the flagged HELLO messages are placed onto transmit link 11025). The Slave Arbiter 1025, will see the HELLO messages with the "regenerate" flag set, and unblock whichever side is currently blocked (east side port or west side port).

Since each node is regenerating upstream and downstream HELLO messages in the event of an upstream HELLO timeout, a node may be assured that it is directly attached to the segment with the unidirectional failure into its receiver if it experiences a persistent HELLO timeout. The node directly attached to the segment that is experiencing such a receiver failure is responsible for turning the unidirectional break into a bidirectional break and maintaining that break until the failure is cleared and the Slave Arbiter has been given time to re-impose the virtual break.

Note that each Ring Relay downstream from the node adjacent to the break may briefly experience a HELLO timeout before it receives the flagged HELLOs. During the brief period the downstream nodes may also impose a break. However, each node will remove the break once it sees the flagged HELLOs. Also, note that HELLO timeout period (30 ms) is longer than the maximum time to remove the break (10 ms), ensuring that excess virtual breaks do not propagate upstream during this brief period. To illustrate this point, if a unidirectional break that did not generate an OPER DOWN was incurred on link 11010, then after 30 milliseconds, both Ring Relay 1010 and Ring Relay 1020 will note the absence of HELLO messages and take corrective action to impose a break and send flagged HELLO messages. However, when Ring Relay closest to the real failure (in this case Ring Relay 1010) sends out flagged HELLO protocol packets on link 11025, these HELLO messages will be received by Ring Relay 1020 which will stop imposing a break on links 11027 and 11025.

When a Ring Relay comes back after an OPER DOWN or a HELLO timeout failure, the Ring Relay resumes transmissions of normal HELLO messages first then there is an imposed delay (fd as discussed above) before removing the virtual breaks for data on both the receiver link deemed to have failed and the transmit link on that same port to avoid having a temporary loop before the Slave Arbiter has a chance to impose a virtual break.

The Master Arbiter must be modified to incorporate rules used by the Ring Relays as the Master Arbiter acts much like a Ring Relay with respect to reacting to a lack of HELLOs or an OPER DOWN on a receiver link for the Master Arbiter. More specifically, the Master Arbiter must be adapted to suppress transmission of user data and set the regenerate bit on transmitted HELLOs on a port that is experiencing HELLO timeouts or an OPER DOWN. In this case the Master Arbiter may surmise that the unidirectional break is present on its directly attached segment. If flagged or original HELLOs are received, the Master Arbiter transmits HELLOs with no regenerate flag set and passes user data as usual after a period of delay sufficient to allow the Slave Arbiter time to reinsert the virtual break and thus avoid a temporary loop. A Master Arbiter modified to act like a Ring Relay would respond to a failure by sending flagged HELLOs out both ports.

One minor difference between a Master Arbiter and a Ring Relay is that the Master Arbiter knows that the Slave Arbiter is both on the east side and on the west side of the Master Arbiter. In contrast as a Ring Relay does not ordinarily send HELLO messages through a Master Arbiter, the Slave Arbiter is only to one side of the Ring Relay, not both. In a preferred embodiment, the Master Arbiter is configured to transmit flagged HELLOs just on the port with the receive link deemed to have failed. The partner port continues to send normal HELLOs The following example uses the network loop shown in FIG. 10 but assumes that all links are initially working properly. When link 11012 fails through either an OPER DOWN or a problem that causes Master Arbiter 1000 to note that the west port is not receiving HELLOs, a Master Arbiter configured to send flagged HELLOs on link 11010 but continues to send normal HELLO messages on its partner port may not actually provide notice to Slave Arbiter 1025 of a problem as there may have been a bidirectional break rendering link 11010 inoperative. More specifically, when a bidirectional failure is experienced at links 11012 and 11010, then the Master Arbiter would impose a virtual break on the west port (as it does not know whether the break is a unidirectional break link 11012 only or a bidirectional break as generally it is not possible to perceive a break on a transmit link) but continue to send flagged HELLOs on transmit port 11010. As these flagged HELLOs cannot reach Ring Relay node 1010 across broken link 11010, Ring Relay node 1010 will also note the gap in HELLOs and will take steps to impose a virtual break on links 11012 and 11010. When Ring Relay 1010 responds to the gap in HELLOs or OPER DOWN a portion of the response will include the sending of flagged HELLO protocol packets on link 11025.

These flagged HELLO protocol packets from Ring Relay 1010 ultimately reach the Slave Arbiter and trigger the removal of the virtual break at a port connected to Slave Arbiter 1025.

The Slave Arbiter has two tasks. The first task is like other nodes, it converts sensed link failures (either OPER DOWN or HELLO Timeout) as a potential unidirectional break and imposes a break on the transmit link on the port with the perceived failure of its receive link. The Slave Arbiter has the second task of removing the imposed virtual break that is used to avoid looping after another bidirectional break exists in the network loop.

The methods of implementing these two tasks could be done in several different ways depending on a design choice to use common instructions for both Master Arbiter and Slave Arbiter in their response to what may be a unidirectional failure. Using common instructions for this aspect of operation is potentially useful as in the preferred embodiment an Arbiter contains the instruction set necessary to act as either a Master Arbiter or a Slave Arbiter.

Assuming that the design choice is made to use common instructions with the Master Arbiter, the sequence of events for a break detected by a Slave Arbiter is illustrated by the following examples using the components shown in FIG. 10. In each example, the example starts with all links functioning (including link 11027) and with a virtual break imposed on the east port of Slave Arbiter 1025 (links 11030 and 11032 passing HELLOs but not user data).

First Case—Break on Incoming Link on Port Away from Virtual Break

Link 11035 experiences a failure that does not lead to an OPER DOWN but does lead to a HELLO timeout noted at Slave Arbiter 1025. The Slave Arbiter acts like any other node to impose a bidirectional break at the failed port. The Slave Arbiter imposes a break on links 11035 and 11037. If the Slave Arbiter is using common instructions with the Master Arbiter mode, then the Slave Arbiter would send flagged HELLOs instead of HELLOs on link 11037 despite the fact that this flagged HELLO is only of significance to the Slave Arbiter.

The recovery in this first case would start when the problem with link 11035 is corrected and normal HELLOs from Master Arbiter 1000 are again received at the Slave Arbiter on link 11035. A Slave Arbiter using common instructions with a Master Arbiter would stop sending flagged HELLOs and would resume sending normal HELLOs. The Slave Arbiter would re-impose the virtual break so the virtual break is in place after the imposed bidirectional break is removed. After a delay of fd, the Slave Arbiter would remove the imposed bidirectional break.

Second Case—Bidirectional Break between Ring Nodes

Link 11025 experiences a failure that does not lead to an OPER DOWN but does lead to a HELLO timeout noted at Ring Relay node 1020. The problem is actually bidirectional so that Ring Relay 1010 also experiences a HELLO timeout on link 11027. As described above, Ring Relay node 1020 would create a bidirectional break on the port experiencing the receiver failure so that no data passes through that port but sends out flagged HELLOs onto link 11027 and listens for HELLOs on link 11025. Ring Relay 1020 sends out flagged HELLOs on both link 11027 and link 11035.

As Ring Relay 1010 is also experiencing a HELLO timeout on link 11027, this Ring Relay imposes a bidirectional break on links 11027 and 11025 and sends out flagged HELLOs on links 11025 and link 11012.

The Slave Arbiter would start the process described in the First Case of imposing a bidirectional break on links 11035 and 11037 in addition to the existing virtual break on the east port since the Slave Arbiter would have no way of knowing if the problem was in the link adjacent to the Slave Arbiter or upstream from there. The flagged HELLOs sent on link 11035 are received at Slave Arbiter 1025 which then removes the virtual break on links 11030 and 11032 as the receipt of a flagged HELLO indicates that a bidirectional break is being imposed by another node on the network ring. After a delay of fd, the Slave Arbiter would remove the imposed bidirectional break on links 11037 and 11035. After this sequence of events the network ring would have an imposed bidirectional break on links 11025 and 11027 at Ring Relay 1020 and again at Ring Relay 1010.

When the problem on links 11025 and 11027 are resolved, Ring Relay nodes 1010 and 1020 will stop sending flagged HELLO and then after a delay remove the imposed bidirectional breaks on links 11027 and 11025. Slave Arbiter 1025 upon receipt of a normal HELLO from Master Arbiter 1000 will impose a virtual break on the port in Master Forwarding mode which in this situation should be the east port (links 11030 and 11032).

Third Case—Break on Outgoing Link on Port away from Virtual Break

Link 11037 experiences a failure that does not lead to an OPER DOWN but does lead to a HELLO timeout noted at Ring Relay 1020. As noted above, Ring Relay 1020 will impose a bidirectional break on links 11037 and 11035 and start sending flagged HELLOs on links 11035 and 11027. (As the temporary imposition of additional bidirectional breaks by downstream nodes such as Ring Relay 1010 and Master Arbiter 1000 has already been explained above, it will be omitted in subsequent discussions). The Slave Arbiter will remove the virtual break at links 11030 and 11032 after receiving a flagged HELLO on link 11035. When the problem with link 11037 is resolved, the Ring Relay 1020 will stop sending flagged HELLOs and will allow normal HELLOs originating from Master Arbiter 1000 to reach the Slave Arbiter 1025 on link 11035. The response to the receipt of normal HELLOs instead of flagged HELLOs by the Slave Arbiter 1025 is to re-impose the virtual break on links 11030 and 11032.

Fourth Case—Break on Incoming Link at Virtual Break

Link 11030 experiences a failure that does not lead to an OPER DOWN but does lead to HELLO timeout at Slave Arbiter 1025. Although link 11030 has an imposed virtual break for data traffic, HELLOs are received at Slave Arbiter 1025 and the lack of HELLOs triggers a response. Functionally, a bidirectional break is imposed on links 11030 and 11032 (including the transmission of flagged HELLOs if the Slave Arbiter is configured to use the same code as the Master Arbiter), then after a short delay, the virtual break is removed from links 11030 and 11032. One of skill in the art can recognize that the logic could be modified to simply leave the virtual break in place but note that the reason for the break has changed from the Slave Arbiter needing to impose a virtual break to the need to convert a potential unidirectional break into a bidirectional break.

After the problem on link 11032 is corrected, the Slave Arbiter receives normal HELLO messages from Master Arbiter 1000 and reverses the process by first imposing a virtual break on links 11030 and 11032 and then removing the imposed bidirectional break on links 11030 and 11032.

Again, one of ordinary skill in the art can see that this can be done by changing the reason for the break without adding and removing breaks.

Fifth Case—Break on Outgoing Link at Virtual Break

Link 11030 experiences a failure that does not lead to an OPER DOWN but does lead to a HELLO timeout at Ring Relay 1015 (and as discussed above, temporarily at Ring Relay 1005 and Master Arbiter 1000). To distinguish this example from the last case, assume that the problem is unidirectional such that link 11032 is operating properly and Slave Arbiter 1025 is receiving HELLOs on link 11032. Ring Relay 1015 imposes a bidirectional break on links 11030 and 11032 and starts to send flagged HELLOs on links 11032 and 11020. This bidirectional break imposed by Ring Relay 1015 is redundant to the virtual break already imposed by the Slave Arbiter as both block data but not HELLOs. The receipt of a flagged HELLO at link 11032 of Slave Arbiter 1025 indicates that another node has imposed a bidirectional break so the virtual break is removed from 11030 and 11032 by the Slave Arbiter. While the removal of a virtual break from links 11030 and 11032 has no practical effect, one can appreciate that the Slave Arbiter does not know whether the flagged HELLOs are coming from an immediately adjacent node (Ring Relay 1015) or a remote node (such as Ring Relay 1005 or Master Arbiter 1000). If the flagged HELLOs were coming from a remote node, then removal of the virtual break would make the adjacent node (in this case Ring Relay 1015) connected for data communication with the rest of the ring.

When the problem with link 11030 is corrected, Ring Relay 1015 will receive normal HELLO messages from Slave Arbiter 1025. The receipt of normal HELLO messages will cause the Ring Relay to stop sending flagged HELLO messages. The receipt of a normal HELLO message at link 11032 of Slave Arbiter 1025 will cause the Slave Arbiter to re-impose a virtual break on links 11030 and 11032. After a short delay, Ring Relay 1015 removes the bidirectional break from links 11030 and 11032.

Separation of HELLO Message and Imposed Break Message

One of ordinary skill in the art can see that a flagged HELLO protocol packet as discussed above actually serves two purposes. First purpose is to provide a HELLO message to downstream nodes so that the HELLO timers do not see a gap in HELLOs. The second purpose is to convey a message to the Slave Arbiter that another node has imposed a bidirectional break so the Slave Arbiter can remove the virtual break. A modification to the disclosed embodiment would be to pass (and create if necessary) HELLO messages whenever the preferred embodiment calls for a flagged HELLO and to augment that with another control signal message that indicates that a device has imposed a bidirectional break. The Slave Arbiter would react to the control signal message to remove the virtual break. One of ordinary skill in the art will recognize that a system using a separate control signal in lieu of the field in the flagged HELLOs could communicate to the Slaver Arbiter the need to re-impose the virtual break either by ceasing to send a control signal to remove the virtual break or by sending a control signal to re-impose the virtual break.

While discussing the flagged HELLO message it is worth noting that flagged HELLO protocol packets are sometimes called regenerated HELLO protocol packets or regenerated HELLO messages as ring relays "regenerate" HELLOs when they do not receive them. However as not all of these flagged HELLO messages are actually "regenerated," flagged is a better descriptor that regenerated. The term "flagged" should not be read as limiting the way of distinguishing one type of HELLO from another to setting a flag value, although that is a suitable solution. Any readily discernible difference between the normal HELLOs and the flagged HELLOs such that the Slave Arbiter can discern the information conveyed by the use of the flagged HELLO is sufficient.

Unidirectional Transmission of Flagged HELLOs

Another variation on the preferred embodiment differs at the Ring Relay in that the Ring Relay would send flagged HELLOs out the partner port of the port with the failure on the incoming link but the outgoing link on the port with the failure on the incoming link would continue to get whatever HELLOs were received by the Ring Relay. For example, using FIG. 10 with all links operating including 11027, if Ring Relay 1020 stopped receiving HELLOs on incoming link 11037, then Ring Relay 1020 would send flagged HELLOs out link 11027 but would not replace the HELLOs received on link 11025 with flagged HELLOs for transmission on link 11035. This reduces the actions necessary at Ring Relay 1020.

In order for this variation to reliably provide the flagged HELLOs to the Slave Arbiter 1025, the Master Arbiter 1000 would need to be modified to respond to the receipt of a flagged HELLO from an incoming link by reflecting back a flagged HELLO on the corresponding outgoing link on that same port. In this case a HELLO timeout on link 11037 would lead to the creation of a flagged HELLO at Ring Relay 1020 which would be passed over link 11027 to Ring Relay 1010 and then over link 11012 to Master Arbiter 1000. Master Arbiter 1000 would respond by sending a flagged HELLO out link 11010 to Ring Relay 1010 then over link 11025 to Ring Relay 1020 and finally over link 11035 to Slave Arbiter 1025. In the event that the problem at 11037 was part of a bidirectional problem involving link 11037, then Slave Arbiter 1025 would not receive the flagged HELLO from Master Arbiter 1000 but would respond to a HELLO timeout and impose a bidirectional break on its own.

Rings Without a Master Arbiter

In yet another embodiment, Master Arbiter 1000 shown in FIG. 10 (with link 11027 assumed to be working in this example) could be removed from the ring so that Ring Relay 1010 is connected directly to Ring Relay 1005. In this embodiment, the Slave Arbiter 1025 would be the only source of normal HELLOs. Each ring relay could send out flagged HELLOs in just the direction with the incoming link having a problem. For example, if incoming link 11025 for Ring Relay 1020 experienced a HELLO timeout as part of a unidirectional failure, then Ring Relay 1020 could send flagged HELLOs (or some other control signal) out 11027 and the flagged HELLO would reach the Slave Arbiter. The Slave Arbiter would react to an OPER DOWN or a lack of HELLOs as described above. In this embodiment, there is no need for the Slave Arbiter to switch from sending HELLOs to flagged HELLOs (those with the control signal noting that the Slave Arbiter is imposing a bidirectional break on a port) as only the Slave Arbiter reacts to a difference between a HELLO and a flagged HELLO.

Dual Homing Using a Single Node Ring

Figure 11:
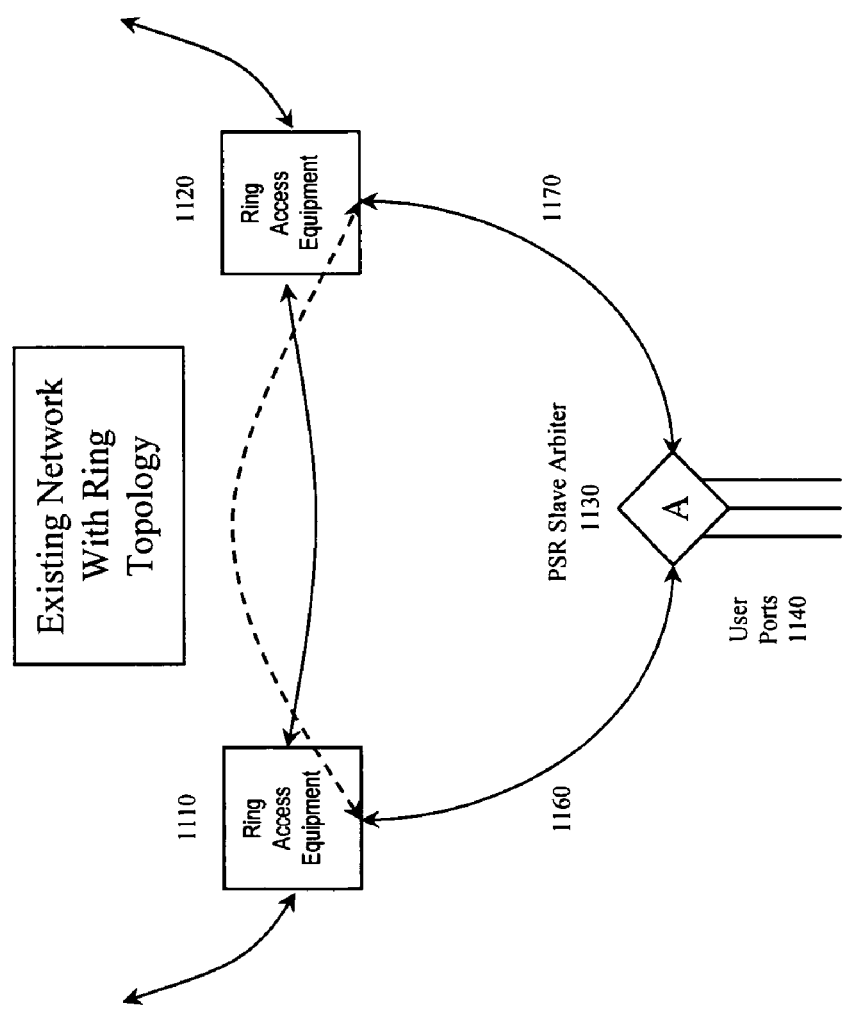
FIG. 11 shows the "Dual Homing" embodiment providing User Ports 1140 with redundant links to the existing network.

FIG. 11 shows an application of a particular embodiment of the present invention that is referred to as "dual homing".

Dual homing allows a Slave Arbiter Node 1130 to provide protected access for User Ports 1140 to network via Ring Access Equipment nodes 1110 and 1120 using redundant links 1160 and 1170.

In this alternative embodiment, the Slave Arbiter node 1130 would see its own HELLOs. As described in Table C, one side of 1130 (for example the west side of the Slave Arbiter connected to link 1160) would go to the SLAVE FORWARDING state and one side (for example, the east side of the Slave Arbiter connected to link 1170) would go to the BLOCKED state.

Now, in response to a fault on the Ring Access Equipment 1110 or the link 1160, the east side of the Slave Arbiter 1130 would unblock, and the User Ports 1140 would continue to have access to the network. The network access for User Ports 1140 is therefore protected against faults in either the access links (1160 and 1170) as well as in the Ring Access Equipment nodes (1110 and 1120).

Unidirectional Break for Dual Homing Using a Single Node Ring

Figure 12:
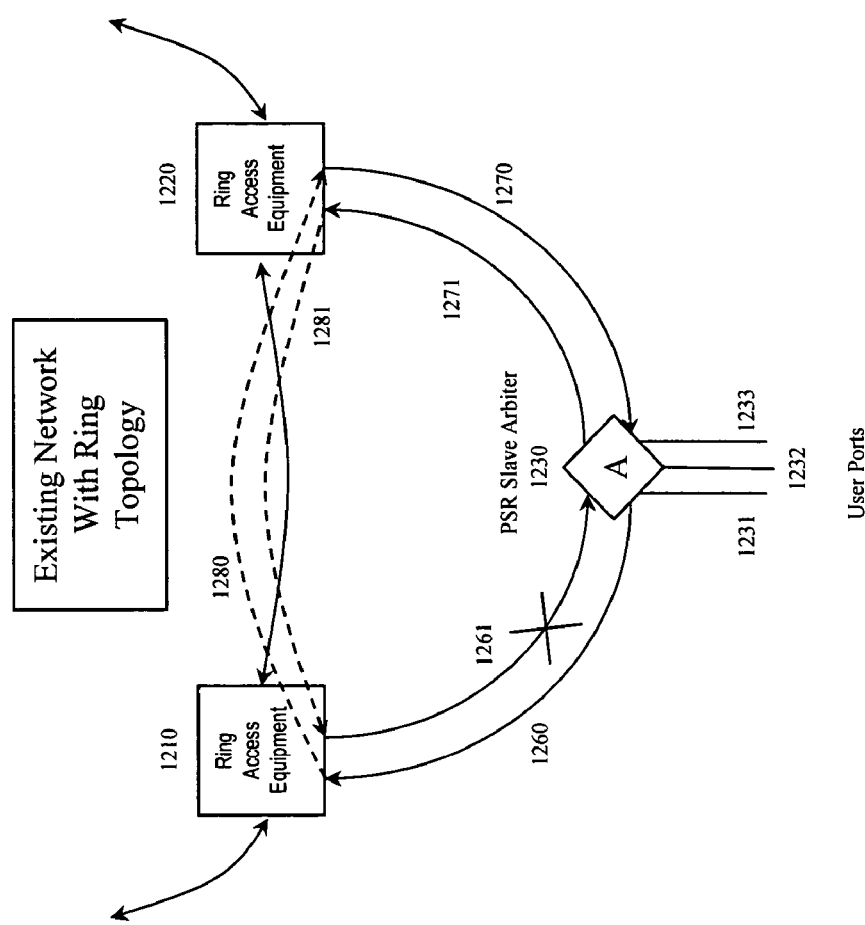
FIG. 12 shows a "Dual Homing" embodiment providing User Ports 1231, 1232, and 1233 with redundant links to the existing network and showing the individual unidirectional links rather than bidirectional links in order to discuss a method of responding to a unidirectional break.

FIG. 12 is another view of a Dual Homing application. Dual homing allows a Slave Arbiter Node 1230 to provide protected access for User Ports 1231, 1232, and 1233 to network via Ring Access Equipment nodes 1210 and 1220 using redundant links. In order to discuss a unidirectional break, the redundant links are shown in using the various unidirectional components: 1260, 1261, 1270, and 1271.

Through the use of FIG. 12, it is possible to discuss an embodiment of a dual homing ring experiencing a unidirectional break. In this embodiment the following rules are followed;

No OPER DOWN and receiving HELLOs on both ports: Impose a virtual break on one bidirectional port as discussed in connection with FIG. 11 to block data packets but not control messages such as HELLOs.

Experiencing a HELLO timeout on both ports or a HELLO timeout on one port and an OPER DOWN on the other port (indication a problem in Ring Access Equipment 1210 or 1220 or a bidirectional break: Remove the virtual break from the port with the imposed virtual break so that user ports can have access to the network through either access point (if either is working)).

Experiencing an OPER DOWN or a HELLO timeout on one port but not the other (indicating a unidirectional break):
On the port with a failed receiver (either OPER DOWN or no HELLOs) impose a bidirectional break so that the virtual break can be removed without causing a unidirectional loop.
After the bidirectional break is imposed, then remove the virtual break.
After the problem with the receiver is corrected, then impose the virtual break before removing the bidirectional break.

For example, consider the case where 1230 is initially imposing a virtual break on its east side (links 1270 and 1271). Upon a HELLO timeout on link 1261, Slave Arbiter 1260 it would impose a bidirectional break on links 1261 and 1260 and remove the virtual break on links 1270 and 1271. After the problem with link 1261 was corrected, the virtual break would be imposed on links 1270 and 1271 and the imposed bidirectional break on links 1260 and 1261 would be removed a short time later. One of ordinary skill in the art will recognize that the imposition of a virtual break could be done on the opposite port from the port which most recently had the virtual break without deviating from the teachings of the present application.

If the lack of HELLOs was on the side with the imposed virtual break then the Slave Arbiter 1230 would impose a bidirectional break on links 1270 and 1271 before removing the pre-existing virtual break on links 1270 and 1271. Upon receipt of HELLOs on link 1270, the process would be reversed with the imposition of a virtual break on links 1270 and 1271 before removing the bidirectional break on links 1270 and 1271. One of ordinary skill in the art could modify to the control rules to simply maintain the imposed break if called for by the rules for virtual breaks or if called for by the rules for bidirectional breaks rather than imposing and removing redundant breaks.

There is no need for flagged HELLOs in this situation as the only device that makes use of the distinction between a normal HELLO and a flagged HELLO is the slave arbiter that is sending the HELLOs.

Use of a Control Message in Place of the fd Timer

The preferred embodiments disclose using a timing delay to ensure that a port progressing from OPER DOWN to operational delays removal of the bidirectional break long enough for the Slave Arbiter to impose a virtual break. Likewise a port that had experienced a HELLO timeout delays removing the bidirectional break long enough for the Slave Arbiter to impose a virtual break. One of skill in the art will recognize that the use of the timer could be replaced by a control signal sent by the Slave Arbiter after it has successfully imposed the new break before removing the previously existing break. Analogous to the regenerate flag in the flagged HELLO message, this control signal could be a flag set in the HELLO protocol packet sent by the Slave Arbiter.

One of skill in the art will recognize that alternative embodiments set forth above are not universally mutually exclusive and that in some cases alternative embodiments can be created that implement two or more of the variations described above.

Those skilled in the art will recognize that the methods and apparatus of the present invention have many applications and that the present invention is not limited to the specific examples given to promote understanding of the present invention. Moreover, the scope of the present invention covers the range of variations, modifications, and substitutes for the system components described herein, as would be known to those of skill in the art.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

| ACRONYMS | |
| --- | --- |
| ES | Extension Side |
| FR | Full Ring |
| HA | High Availability |
| IP | Internet Protocol |
| MAC | Media Access Control |
| MPLS | Multiprotocol Label Switching |
| PDU | Packet Data Unit |
| PSR | Protected Switching Ring |
| RA | Ring Arbiter |
| RPR | Resilient Packet Ring |

-continued

| ACRONYMS | | |
|---|---|---|
| RR | Ring Relay | |
| RS | Ring Side | |
| TCP | Transmission Control Protocol | |
| UDP | User Datagram Protocol | |

What is claimed is:

1. A network ring that is manipulated to provide a virtual break in order to operate within a network requiring a tree topology, the network carrying data packets, the network ring comprising:
A) a first ring device which is a type of ring node, the first ring device comprising:
a set of ring device ports including:
a first ring port with a first incoming link and a first outgoing link;
a second ring port with a second incoming link and a second outgoing link wherein the first ring port is a partner ring port to the second ring port and the second ring port is a partner ring port to the first ring port; and
a first subscriber port with a third incoming link and a third outgoing link;
a forwarding database comprising associations between pairs of packet source address and ring device port identifying which ring device port received a data packet from that paired packet source address; and;
B) a Slave Arbiter (SA) which is another type of ring node, the Slave Arbiter comprising:
a pair of Slave Arbiter ring ports consisting of:
a first ring port with a first incoming link and a first outgoing link;
a second ring port with a second incoming link and a second outgoing link wherein the first ring port is a partner ring port to the second ring port and the second ring port is a partner ring port to the first ring port;
a forwarding database comprising associations between pairs of packet source address and ring device port identifying which Slave Arbiter ring port received a data packet from that paired packet source address; and
a SA control system;
the SA control system comprising controls over the introduction and removal of a virtual break to prevent the formation of a communication ring for data packets within the network requiring a tree topology through the use of at least one non-forwarding state wherein control traffic is forwarded but data packets are not forwarded; the SA control system comprising:
at least one rule causing the operation of a Slave Arbiter ring port in a slave-forwarding state wherein the Slave Arbiter ring port forwards data packets and control traffic received at the Slave Arbiter ring port from the first incoming link or from the second incoming link to the Slave Arbiter and from the Slave Arbiter to the first outgoing link or to the second outgoing link;
at least one rule causing the Slave Arbiter to operate when the network ring is fully operational such that one Slave Arbiter ring port is in a slave-forwarding state and the other Slave Arbiter ring port is in a non-forwarding state wherein control traffic is forwarded but data packets are not forwarded;
at least one rule for changing the state of the Slave Arbiter to have the two Slave Arbiter ring ports acting to forward data packets after a functional break in the network ring is discerned; and
at least one rule for changing the state of one of the two Slave Arbiter ring ports to a non-forwarding state wherein control traffic is forwarded but data packets are not forwarded after detection that the functional break has been removed;
wherein
a data packet received by a ring node is forwarded using a bridging technique if the forwarding database for that ring node does not have an association for a packet source address corresponding to that data packet and;
data packets are not received by the Slave Arbiter through a Slave Arbiter ring port in a non-forwarding state and data packets are not forwarded through the outgoing link on a Slave Arbiter ring port in a non-forwarding state.

2. The network ring of claim 1 wherein the first ring device further comprises:
a second subscriber port with a fourth incoming link and a fourth outgoing link; and
a ring device control system, the ring device control system comprising:
at least one rule causing the operation of the first ring device to maintain the forwarding database comprising associations between pairs of packet source address and ring device port identifying which ring device port received a data packet from that paired packet source address;
at least one rule causing the operation of the first ring device to act upon a data packet addressed to a unicast address not contained in the forwarding database for the first ring device by forwarding the data packet out through each ring device port on the first ring device except for the ring device port that received that data packet;
at least one rule causing the operation of the first ring device to act upon a data packet arriving from a subscriber port with a destination address corresponding to a source address in the forwarding database to forward the data packet to both the first ring port and the second ring port, unless the forwarding database associates a packet source address equal to the destination address with another subscriber port connected to the first ring device, in which case the data packet is forwarded to the another subscriber port and not forwarded to either the first ring port or the second ring port;
at least one rule causing the operation of the first ring device to act upon a data packet arriving from the first ring port or the second ring port with a destination address corresponding to a source address in the forwarding database that is associated with a subscriber port by forwarding the data packet to both the partner ring port and the subscriber port associated with that corresponding source address; and
at least one rule causing the operation of the first ring device to act upon data packets arriving from the first ring port or the second ring port with a destination address corresponding to a source address in the forwarding database that is associated with either the first ring port or the second ring port for the first ring device by forwarding the data packet to the partner ring port.

3. The network ring of claim 1 wherein the first ring device further comprises a ring device control system, the ring device control system comprising:
- at least one rule causing the operation of the first ring device to read the source address of an incoming data packet and store the source address with the identity of the ring device port on the first ring device that received the incoming data packet;
- at least one rule causing the operation of the first ring device to act upon a data packet addressed to a unicast address not contained in the forwarding data base for the first ring device by forwarding the data packet out through each ring device port on the first ring device except for the ring device port that received that data packet;
- at least one rule causing the operation of the first ring device to act upon a data packet arriving from the subscriber port with a destination address corresponding to a source address in the forwarding database to forward the data packet to both the first ring port and the second ring port;
- at least one rule causing the operation of the first ring device to act upon a data packet arriving from a ring device port with a destination address corresponding to a source address in the forwarding database that is associated with the subscriber port by forwarding the data packet to both the partner ring port and the first subscriber port; and
- at least one rule causing the operation of the first ring device to act upon a data packet arriving from the first ring port or the second ring port with a destination address corresponding to a source address in the forwarding database that is associated with either the first ring port or the second ring port for the first ring device by forwarding the data packet to the partner ring port.

4. The network ring of claim 2 wherein the Slave Arbiter further comprises:
- a first subscriber port with a third incoming link and a third outgoing link;
- a second subscriber port with a fourth incoming link and a fourth outgoing link; and wherein the SA control system further comprises:
- at least one rule causing the operation of the Slave Arbiter to maintain the forwarding database comprising associations between pairs of packet source address and ring device port identifying which ring device port received a data packet from that paired packet source address;
- at least one rule causing the operation of the Slave Arbiter to act upon a data packet addressed to a unicast address not contained in the forwarding database for the Slave Arbiter by forwarding the data packet out through each ring device port on the Slave Arbiter except for the ring device port that received that data packet;
- at least one rule causing the operation of the Slave Arbiter to act upon a data packet arriving from either the first subscriber port or the second subscriber port with a destination address corresponding to a source address in the forwarding database to forward the data packet to both the first ring port and the second ring port, unless the forwarding database associates a packet source address corresponding to the destination address with another subscriber port connected to that Slave Arbiter, in which case the data packet is forwarded to the another subscriber port and not forwarded to either the first ring port or the second ring port;
- at least one rule causing the operation of the Slave Arbiter to act upon a data packet arriving from either the first ring port or the second ring port with a destination address corresponding to a source address in the forwarding database that is associated with either the first subscriber port or the second subscriber port by forwarding the data packet to both the partner ring port and the subscriber port associated with source address corresponding to the destination address; and
- at least one rule causing the operation of the Slave Arbiter to act upon data packets arriving from the first ring port or the second ring port with a destination address corresponding to a source address in the forwarding database that is associated with either the first ring port or the second ring port for the Slave Arbiter by forwarding the data packet to the partner ring port.

5. A ring device for use in a network ring, the ring device comprising:
- a set of ring device ports including:
  - a set of ring ports including:
    - a first ring port with a first incoming link and a first outgoing link; and
    - a second ring port with a second incoming link and a second outgoing link wherein the first ring port is a partner ring port to the second ring port and the second ring port is a partner ring port to the first ring port; and
  - a set of subscriber ports including:
    - a first subscriber port with a third incoming link and a third outgoing link; and
    - a second subscriber port with a fourth incoming link and a fourth outgoing link;
- a forwarding database comprising associations between pairs of a data packet source address and a ring device port that received the data packet; and
- a control system, the control system having a set of rules comprising:
  - at least one rule causing the operation of the ring device to read the source address of an incoming data packet and store an associating between the source address and the ring device port on that ring device that received the incoming packet;
  - at least one rule causing the operation of the ring device to act upon a data packet addressed to a unicast address not contained in the forwarding database for that ring device by forwarding the data packet out through each ring device port on that ring device except for the ring device port that received that data packet;
  - at least one rule causing the operation of the ring device to act upon a data packet received at a subscriber port with a destination address corresponding to a source address in the forwarding database to forward the data packet to both ring ports, unless the forwarding database associates the destination address with another subscriber port connected to that ring device, in which case the data packet is forwarded to the another subscriber port and not forwarded to either ring port;
  - at least one rule causing the operation of the ring device to act upon a data packet received at a ring port with a destination address corresponding to a source address in the forwarding database that is associated with a subscriber port by forwarding the data packet to both the partner ring port and the subscriber port associated with the source address corresponding to that destination address; and at least one rule causing the operation of the ring device to act upon a data packet received at a ring port with a destination address corresponding to a source address in the forwarding database that is associated with either ring port for that ring device by forwarding the data packet to the partner ring port to the ring port that received the data packet.

6. The ring device of claim 5 wherein the control system is implemented such that a single rule causes the operation of the ring device to act in accordance with at least two of a set of control system rules enumerated in claim 5.

7. The ring device of claim 5 wherein the source address and the destination address used by the control system are a Media Access Control (MAC) address a destination MAC address.

8. The ring device of claim 5 wherein the control system further comprises at least one rule causing the ring device to impose a virtual break at the first ring port so that data packets are not passed from the first incoming link to the ring device and do not impact the forwarding database and data packets are not passed from the ring device to the first outgoing link.

9. A ring device for use in a network ring, the ring device comprising:

a set of ring device ports including:
  a set of ring ports including:
    a first ring port with a first incoming link and a first outgoing link; and
    a second ring port with a second incoming link and a second outgoing link wherein the first ring port is a partner ring port to the second ring port and the second ring port is a partner ring port to the first ring port;
  a first subscriber port with a third incoming link and a third outgoing link;
a forwarding database comprising associations between pairs of a data packet source address and a ring device port that received the data packet; and
a control system, the control system having a set of rules comprising:
  at least one rule causing the operation of the ring device to read the source address of an incoming data packet and store an associating between the source address and the ring device port on that ring device that received the incoming packet;
  at least one rule causing the operation of the ring device to act upon a data packet addressed to a unicast address not contained in the forwarding database for that ring device by forwarding the data packet out through each ring device port on that ring device except for the ring device port that received that data packet;
  at least one rule causing the operation of the ring device to act upon a data packet received at the first subscriber port with a destination address corresponding to a source address in the forwarding database to forward the data packet to both ring ports;
  at least one rule causing the operation of the ring device to act upon a data packet received at a ring port with a destination address corresponding to a source address in the forwarding database that is associated with the subscriber port by forwarding the data packet to both the partner ring port and the subscriber port; and at least one rule causing the operation of the ring device to act upon data packets received at a ring port with a destination address corresponding to a source address in the forwarding database that is associated with either ring port for that ring device by forwarding the data packet to the partner ring port to the ring port that received the data packet.

10. The ring device of claim 9 wherein the control system is implemented such that a single rule causes the operation of the ring device to act in accordance with at least two of a set of control system rules enumerated in claim 9.

11. The ring device of 9 wherein the control system further comprises at least one rule causing the ring device to impose a virtual break at the first ring port so that data packets are not passed from the first incoming link to the ring device and do not impact the forwarding database and data packets are not passed from the ring device to the first outgoing link.

12. A method of operating a network ring that is manipulated to provide a virtual break in order to operate within a network requiring a tree topology, the network carrying data packets, the network ring comprising a set of ring devices, each ring device having:

a set of ring device ports including:
  a set of ring ports consisting of:
    a first ring port with a first incoming link and a first outgoing link; and
    a second ring port with a second incoming link and a second outgoing link wherein the first ring port is a partner ring port to the second ring port and the second ring port is a partner ring port to the first ring port;
  at least one subscriber port with a third incoming link and a third outgoing link;
control rules to selectively switch at least one of the ring ports to a non-forwarding state wherein data packets do not enter the ring device through that ring port and thus are not received and data packets do not exit the ring device through that ring port such that the at least one ring device can selectively impose a virtual break in the network ring to prevent data packets from entering into a loop;

the method of operation of the network ring comprising:
maintaining for each ring device a forwarding database that associates an address with the ring device port that most recently received a data packet with that address as the source address;
upon receipt of a data packet at a ring device port with a destination address that is not an address listed in the forwarding database, forwarding the data packet out of the outgoing link for:
  the first ring port unless the first ring port received the data packet or the first ring port is in a non-forwarding state;
  the second ring port unless the second ring port received that data packet or the second ring port is in a non-forwarding state; and
  each of the at least one subscriber port unless that subscriber received the data packet;
upon receipt of a data packet at a subscriber port with a destination address listed in the forwarding database as associated with another subscriber port, forwarding the data packet to the other subscriber port;
upon receipt of a data packet at a subscriber port with a destination address listed in the forwarding database as associated with one of the set of ring ports, forwarding the data packet to out the first outgoing link for the first ring port unless the first ring port is in a non-forwarding state and forwarding that data packet out the second outgoing link for the second ring port unless the second ring port is in a non-forwarding state;

upon receipt of a data packet at a ring port that is not in a non-forwarding state with a destination address listed in the forwarding database as associated with a specific subscriber port, forwarding the data packet out the outgoing link for the specific subscriber port unless the specific subscriber port is in a non-forwarding state and out the outgoing link for the partner ring port unless the partner ring port is in a non-forwarding state; and upon receipt of a data packet at a ring port that is not in a non-forwarding state with a destination address listed in the forwarding database as associated with either ring port, then forward the data packet out the outgoing link for the partner ring port unless the partner ring port is in a non-forwarding state.

13. The method of claim 12 wherein the source address and the destination address used are the source MAC address and the destination MAC address.

14. The method of claim 12 wherein the operation of a ring device with the ring device's first ring port in a non-forwarding state is as follows:

upon receipt of a data packet at a ring device port with a destination address that is not an address listed in the forwarding database by forwarding the data packet out:
the first ring port unless the first ring port received the data packet but since the first ring port is in a non-forwarding state a data packet forwarded to the first ring port does not reach the first outgoing link;
the second ring port unless the second ring port received that data packet; and
each subscriber port unless that subscriber port received the data packet;

upon receipt of a data packet at a subscriber port with a destination address listed in the forwarding database as associated with another subscriber port, then forward the data packet to the another subscriber port;

upon receipt of a data packet at a subscriber port with a destination address listed in the forwarding database as associated with one of the first or second ring ports, then
forward the data packet to the first ring port, but as the first ring port is in a non-forwarding state this data packet does not reach the first outgoing link, and
forward the data packet to the second ring port; and upon receipt of a data packet at the second ring port while it is not in a non-forwarding state, the data packet with a destination address listed in the forwarding database as associated with either the first ring port or the second ring port, then forward the data packet to the first ring port but since the first ring port is in a non-forwarding state, this data packet does not reach the first outgoing link.

15. A ring relay for use in a bidirectional network ring for a ring that is manipulated to provide a virtual break in order to operate within a network requiring a tree topology, the network ring carrying data packets; the ring relay comprising the following attributes:

having a set of ring device ports including:
a set of ring ports including:
a first ring port in data communication with a first incoming link and a first outgoing link; and
a second ring port in data communication with a second incoming link and a second outgoing link connected to the network ring wherein the first ring port is a partner port to the second ring port and the second ring port is a partner port to the first ring port;

a set of subscriber ports including:
a first subscriber port with a third incoming link and a third outgoing link, and
a second subscriber port with a fourth incoming link and a fourth outgoing link;

operating to pass HELLO messages received on the first incoming link to the second outgoing link and to pass HELLO messages received on the second incoming link to the first outgoing link; and after detecting an OPER DOWN failure on the second incoming link, reacting to the detection of the OPER DOWN failure on the second incoming link by:
imposing a break on the second incoming link so that data packets are blocked from passing into the ring relay but the imposed break does not block any incoming HELLO messages;
imposing a break on the second outgoing link so that data packets are blocked from leaving the ring relay on the second outgoing link;
sending a type of HELLO message and a control signal out the second outgoing link such that an adjacent node receives a HELLO message to provide assurance that the second outgoing link from that ring relay is operating and to convey to a node other than the ring relay that the ring relay is imposing a bidirectional break so that the virtual break should be removed;
detecting the cessation of the OPER DOWN failure on the second incoming link then resuming operating to pass HELLO messages received on the first incoming link to the second outgoing link; and
delaying the removal of the imposed break for user data on the second outgoing link and on the second incoming link for a time period sufficient to allow the bidirectional network ring to impose a virtual break at a device other than the ring relay; and handling incoming data packets by set of rules comprising:
at least one rule causing the operation of the ring device to read the source address of an incoming data packet and store an association between the source address and the ring device port on that ring device that received the incoming packet;
at least one rule causing the operation of the ring device to act upon a data packet addressed to a unicast address not contained in the forwarding database by forwarding the data packet out through each outgoing link on that ring device except for the outgoing link on the ring device port that received that data packet or any ring device port in a non-forwarding state;
at least one rule causing the operation of the ring device to act upon a data packet received at a subscriber port with a destination address corresponding to a source address in the forwarding database to forward the data packet out through the outgoing links for both ring ports except for a ring port currently in a non-forwarding state, unless the forwarding database associates the destination address with another subscriber port connected to that ring node, in which case the data packet is forwarded to the another subscriber port and not forwarded out through the outgoing link for either ring port;

at least one rule causing the operation of the ring device to act upon a data packet arriving from a ring port not in a non-forwarding state, the data packet with a destination address corresponding to a source address in the forwarding database that is associated with a subscriber port by forwarding the data packet to a) the outgoing link for the partner ring port unless the partner ring port is in a non-forwarding state and b) the subscriber port associated with that address; and at least one rule causing the operation of the ring device to act upon a data packet received at a ring port not in a non-forwarding state, the data packet with a destination address corresponding to a source address in the forwarding database that is associated with either ring port for that ring node by forwarding the data packet out through the outgoing link for the partner ring port unless the partner ring port is in a non-forwarding state.

16. A ring device for use in a bidirectional network ring for a ring that is manipulated to provide a virtual break in order to operate within a network requiring a tree topology, the network ring carrying data packets; the ring device comprising the following attributes:

having a set of ring device ports including:
  a pair of ring ports consisting of:
    a first ring port in data communication with a first incoming link and a first outgoing link; and
    a second ring port in data communication with a second incoming link and a second outgoing link connected to the network ring, wherein the first ring port is a partner port to the second ring port and the second ring port is a partner port to the first ring port;
  a set of subscriber ports including:
    a first subscriber port with a third incoming link and a third outgoing link; and
    a second subscriber port with a fourth incoming link and a fourth outgoing link;
operating to pass HELLO messages received on the first incoming link to the second outgoing link and to pass HELLO messages received on the second incoming link to the first outgoing link; and
after detecting a gap in the receipt of HELLO messages on the second incoming link in excess of a set threshold, reacting by:
  imposing an imposed break on the second incoming link so that data packets are blocked from passing into the ring device but the imposed break does not block any incoming HELLO messages;
  imposing an imposed break on the second outgoing link so that data packets are blocked from leaving the ring device on the second outgoing link;
  sending a type of HELLO message and a control signal out the second outgoing link such that an adjacent node receives a HELLO message to provide assurance that the second outgoing link from that ring device is operating and to convey to a device other than the ring device that the ring device is imposing an imposed break on the second incoming link and on the second outgoing link so that the virtual break should be removed;
  after receiving a HELLO message on the second incoming link, resuming operating to pass HELLO messages received on the first incoming link to the second outgoing link; and delaying the removal of the imposed break for user data on the second outgoing link and on the second incoming link for a time period sufficient to allow the bidirectional network ring to impose a virtual break at a device other than the ring device;

handling incoming data packets by set of rules comprising:
  at least one rule causing the operation of the ring device to read the source address of an incoming data packet and store an association between the source address and the ring device port on that ring device that received the incoming packet;
  at least one rule causing the operation of the ring device to act upon a data packet addressed to a unicast address not contained in the forwarding database by forwarding the data packet out through the outdoing link for each ring device port on that ring device except for the ring device port that received that data packet and any ring device port in a non-forwarding state;
  at least one rule causing the operation of the ring device to act upon a data packet arriving from a subscriber port with a destination address corresponding to a source address in the forwarding database to forward the data packet out the outgoing links for the pair of ring ports except for a ring port in a non-forwarding state, unless the forwarding database associates the destination address with another subscriber port connected to that ring device, in which case the data packet is forwarded to the another subscriber port and not forwarded out the outgoing link for either of the pair of ring ports;
  at least one rule causing the operation of the ring device to act upon a data packet arriving from a ring port not in a non-forwarding state, the data packet having a destination address corresponding to a source address in the forwarding database that is associated with a subscriber port by forwarding the data packet to both a) the outgoing link for the partner ring port unless the partner ring port is in a non-forwarding state and b) the subscriber port associated with that address; and
  at least one rule causing the operation of the ring device to act upon data packets arriving from a ring port not in a non-forwarding state, the data packet having a destination address corresponding to a source address in the forwarding database that is associated with either of the pair of ring ports for that ring device by forwarding the data packet out the outgoing link for the partner ring port unless the partner ring port is in a non-forwarding state.

17. A ring device comprising:
a set of ring device ports including:
  a pair of ring ports consisting of:
  a first ring port with a first incoming link and a first outgoing link; and
  a second ring port with a second incoming link and a second outgoing link wherein the first ring port is a partner port to the second ring port and the second ring port is a partner port to the first ring port; and
  at least one subscriber port; and
a control system for the ring device; the control system to allow this ring device to provide redundant access for the at least one subscriber port to an existing network through a first access device connected to the first ring port and a second access device in data communication with the first access device and connected to the second ring port such that a HELLO message transmitted out the first outgoing link can travel via the first access device then the second access device to the second incoming link and a HELLO message transmitted out the second outgoing link can travel via the second access device then the first access device to the first incoming link;

the control system having:

at least one rule to impose a virtual break on either the first ring port or the second ring port when HELLO messages are being received on both the first and second ring ports, the virtual break blocking data packets but not control messages such as HELLO messages;

at least one rule to detect and react to a HELLO timeout on both the first and second ring ports by removing the virtual break from either the first ring port or the second ring port so that the at least one subscriber port can have access to the existing network through the first access device connected to the first ring port if that is possible or through the second access device connected to the second ring port if that is possible;

at least one rule to detect and react to a HELLO timeout on one of the pair of ring ports and an OPER DOWN on the partner port by removing the virtual break from either the first ring port or the second ring port so that the at least one subscriber port can have access to the existing network through the first access device connected to the first ring port if that is possible or through the second access device connected to the second ring port if that is possible, this at least one rule not necessarily distinct from the rule to detect and react to a HELLO timeout on both the first and second ring ports;

at least one rule to detect a unidirectional break characterized by an OPER DOWN or a HELLO timeout on one ring port but not the partner port and to react by imposing a bidirectional break on the incoming link and the outgoing link on the ring port with incoming link experiencing an OPER DOWN or a HELLO timeout before removing the virtual break from the ring port with the virtual break;

at least one rule to detect and react to the cessation of the unidirectional break characterized by an OPER DOWN or a HELLO timeout by imposing a Virtual break on one ring port before removing the bidirectional break;

at least one rule causing the operation of the ring device to read the source address of an incoming data packet and store an association between the source address and the ring device port on that ring device that received the incoming packet;

at least one rule causing the operation of the ring device to act upon a data packet addressed to a unicast address not contained in the forwarding database by forwarding the data packet out through the outgoing link for each ring device port on that ring device except for the ring device port that received that data packet and any ring device port in a non-forwarding state;

at least one rule causing the operation of the ring device to act upon a data packet arriving from a subscriber port with a destination address corresponding to a source address in the forwarding database to forward the data packet out the outgoing links for both the first and second ring ports except for a ring port in a non-forwarding state, unless the forwarding database associates the destination address with another subscriber port connected to that ring device, in which case the data packet is forwarded to the another subscriber port and not forwarded out the outgoing link for either the first or the second ring port;

at least one rule causing the operation of the ring device to act upon a data packet arriving from a ring port not in a non-forwarding state, the data packet having a destination address corresponding to a source address in the forwarding database that is associated with a subscriber port by forwarding the data packet to both a) the outgoing link for the partner ring port unless the partner ring port is in a non-forwarding state and b) the subscriber port associated with that address; and at least one rule causing the operation of the ring device to act upon data packets arriving from a ring port not in a non-forwarding state, the data packet having a destination address corresponding to a source address in the forwarding database that is associated with either the first or second ring port for that ring device by forwarding the data packet out the outgoing link for the partner ring port unless the partner ring port is in a non-forwarding state.

\* \* \* \* \*

UNITED STATES PATENT AND TRADEMARK OFFICE
CERTIFICATE OF CORRECTION

PATENT NO. : 7,339,887 B2
APPLICATION NO. : 11/180192
DATED : March 4, 2008
INVENTOR(S) : Griswold et al.

It is certified that error appears in the above-identified patent and that said Letters Patent is hereby corrected as shown below:

Column 29, line 44, there should be a paragraph between the word "link;" and the phrase "and wherein the SA control system further comprises:".

Column 37, line 46 "Virtual" should be "virtual".

Signed and Sealed this

Seventeenth Day of March, 2009

JOHN DOLL
*Acting Director of the United States Patent and Trademark Office*